United States Patent
Hashimoto

(10) Patent No.: US 6,243,662 B1
(45) Date of Patent: Jun. 5, 2001

(54) DATA RELAY DEVICE, INFORMATION TERMINAL EQUIPMENT, COMPUTER-READABLE RECORDING MEDIUM STORING DATA RELAY PROGRAM, AND COMPUTER-READABLE RECORDING MEDIUM STORING INFORMATION BROWSING PROGRAM

(75) Inventor: Sunao Hashimoto, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/176,202

(22) Filed: Oct. 21, 1998

(30) Foreign Application Priority Data

Dec. 11, 1997 (JP) .................................................. 9-341472

(51) Int. Cl.$^7$ .................................................. G06F 15/00
(52) U.S. Cl. .............................. 702/187; 706/47; 706/50; 345/338
(58) Field of Search .............................. 702/187; 706/47, 706/50; 345/338, 348

(56) References Cited

FOREIGN PATENT DOCUMENTS 9-330203  12/1997  (JP) .

OTHER PUBLICATIONS

Kikuchi, H., et al., "A Versioning Method for Hypermedia Communication Architecture," Information Processing Society of Japan, 53$^{rd}$ Annual Convention, Autumn, 1996, pp 3–469—3–470.

Ashizawa, M., et al., "Using Digital Libraries as a Community Hall for Worldwide Information Spiral Development," Hitachi Ltd., Central Research Laboratory. No Date.

*Primary Examiner*—Kamini Shah
(74) *Attorney, Agent, or Firm*—Oliff & Berridge, PLC

(57) ABSTRACT

Information consisting of a plurality of pieces of data can be reproduced in the same state it was browsed previously. On receiving a data acquisition request from a data use unit, a request analysis unit analyzes whether the data acquisition request is a data relay request or a history information acquisition request. As a result of the analysis, if the data acquisition request is a history information acquisition request, the request analysis unit extracts a data name, time, and a search method from the data acquisition request. If the data acquisition request is a history information acquisition request, a history management unit uses a data name and time extracted by the request analysis unit to search a history memory for appropriate history information by a search method extracted by the request analysis unit and outputs data contained in the detected history information.

22 Claims, 24 Drawing Sheets

```
GET url1 HTTP/1.1
  request-time:T11
```

FIG. 3

```
GET url1 HTTP/1.1
```

FIG. 4

```
<HTML>
<HEAD>
  <TITLE>test image</TITLE>
</HEAD>
<BODY>
Image 1:<P>
  <IMG SRC="url2" HEIGHT=50 WIDTH=100>
Image 2:<P>
  <IMG SRC="url3" HEIGHT=50 WIDTH=100>
</BODY>
</HTML>
```

FIG. 5

```
GET url1 HTTP/1.1
version-time:T11
search-direction:backward
auto-fetch-on-failure:true
```

FIG. 9

```
GET url2 HTTP/1.1
version-time:T11
search-direction:forward
auto-fetch-on-failure:true
```

FIG. 10

```
GET url1 HTTP/1.1
version-time:T11
search-direction:backward
correction-info 8/min/add
```

```
GET url1 HTTP/1.1
request-time:T11
host-name:H1
```
151

```
GET url2 HTTP/1.1
request-time:T12
host-name:H1
```
152

```
GET url2 HTTP/1.1
version-time:T31
host-name:H1
search-direction:backward
request-version:2
```

DATA RELAY DEVICE, INFORMATION TERMINAL EQUIPMENT, COMPUTER-READABLE RECORDING MEDIUM STORING DATA RELAY PROGRAM, AND COMPUTER-READABLE RECORDING MEDIUM STORING INFORMATION BROWSING PROGRAM

BACKGROUND OF THE INVENTION

1. Field of the Invention

The present invention relates to a data relay device, information terminal equipment, a computer-readable recording medium storing a data relay program, and a computer-readable recording medium storing an information browsing program, and more particularly to a data relay device storing relayed data as history information, information terminal equipment for gaining access to history information of such a data relay device, a computer-readable recording medium storing a data relay program for storing relayed data as history information, and a computer-readable recording medium storing an information browsing program for gaining access to a data relay device storing history information.

2. Description of the Prior Art

Recently, the exchange of information by use of WWW (World Wide Web) on the Internet is increasing. Use of WWW provides users with the ability to gain easy access to information in the world.

A user browses page data on WWW servers using client software (hereinafter, simply referred to as a client) called a browser. To gain access to information on WWW, an identifier called URL (Uniform Resource Locator) indicating a data position is inputted to the browser. A request to the URL is sent from the browser to the WWW server and data corresponding to the URL is returned. The data is displayed on the browser and the user can browse the data.

Although users browse data on WWW in this way, since information on WWW is always changing, the same contents cannot always be browsed by the same URL. Data contents are updated several times a day in the home pages of most newspaper publishing companies, for example. Accordingly, to rebrowse browsed data later requires that users store the data by some method. For example, if information about desirable data is stored in a computer in which a client is executed, even if the contents of the data within a WWW server have been updated, the pre-update data would be able to be browsed.

However, if data browsed previously is stored in individual computers in which clients are executed, the data cannot be accessed from a plurality of clients. If data browsed previously is stored as history information which can be accessed from a plurality of computers, users are very conveniently accessible to the history information even if the computers they use change. Accordingly, it is conceivable that data relayed is automatically stored as history information in a device (data relay device) for relaying data such as a proxy server so that the history information can be accessed from computers on the network.

However, a WWW page often contains images, which each are specified by a URL different from that of the page. Accordingly, the images are stored in a data relay device as different history information. In the case of rebrowsing such a page consisting of a plurality of pieces of data, a previous browsing state cannot be correctly reproduced without accessing correct pairs of basic data and image data contained in the basic data.

SUMMARY OF THE INVENTION

The present invention has been made in consideration of such a point and its object is to provide a data relay device which enables information consisting of a plurality of pieces of data to be reproduced in the same state that it was browsed previously.

Another object of the present invention is to provide information terminal equipment that can rebrowse information consisting of a plurality of pieces of data in the same state that it was browsed previously.

A further object of the present invention is to provide a computer-readable recording medium storing a data relay program for instructing a computer to perform processing so that information consisting of a plurality of pieces of data can be reproduced in the same state that it was browsed previously.

Still another object of the present invention is to provide a computer-readable recording medium storing an information browsing program for instructing a computer to perform processing so that information consisting of a plurality of pieces of data can be rebrowsed in the same state that it was browsed previously.

To solve the above-mentioned problem, the present invention provides a data relay device relaying data between a data use unit that uses data, and a data supply unit that supplies stored data, the data relay device comprising: a history memory that stores history information of relayed data; a request analysis unit that receives a data acquisition request from the data use unit, analyzes whether it is a data relay request or a history information acquisition request, and extracts a data name from the data acquisition request when the data acquisition request is a data relay request, while extracting a data name, time, and a search method from the data acquisition request when the data acquisition request is a history information acquisition request; a data request unit that, when the data acquisition request is a data relay request, requests data corresponding to the data name extracted by the request analysis unit from the data supply unit and receives data sent from the data supply unit in response to the request; and a history management unit that, when the data acquisition request is a data relay request, associatively stores the data received by the data request unit, the name of the data, and time when data relay processing was performed, in the history memory as history information, and outputs the data received by the data request unit, while, when the data acquisition request is a history information acquisition request, using the data name and time extracted by the request analysis unit to search the history memory for appropriate history information by the search method extracted by the request analysis unit and outputting data contained in the detected history information.

According to such a data relay device, when a data acquisition request is inputted to acquire history information, a data name, time, and a search method are extracted by the request analysis unit. The history management unit uses the data name and time extracted by the request analysis unit to search the history memory for appropriate history information by the search method extracted by the request analysis unit and outputs it to the data use unit.

With this arrangement, when a data acquisition request is outputted from the data use unit to acquire history information, if a proper search method is specified, appropriate history information can be accessed even if correct time is unknown.

Also, to solve the above-mentioned problem, there is provided information terminal equipment that relays data to and from a server and accesses data on the server connected through a network via a data relay device, which associatively manages relayed data, a data name, and time as management information and sends back data contained in appropriate history information in response to a data acquisition request containing a data name, time, and a search method, the information terminal equipment comprising: a request unit that outputs a data acquisition request specifying a data name to the data relay device when accessing the most recent data on the server, and outputs a data acquisition request specifying a data name, time, and a search method when accessing data in history information stored in the data relay device; a data acceptance unit that receives data sent from the data relay device in response to the data acquisition request; and a display device that displays data received by the data acceptance unit on the screen of a display device.

According to such information terminal equipment, when data in history information stored in the data relay device is accessed, a data acquisition request specifying a data name, time, and a search method is outputted by the request unit. Accordingly, a history information acquisition request specifying the search method can be outputted to the data relay device of the present invention.

Also, to solve the above-mentioned problem, there is provided a computer-readable recording medium storing a data relay program for relaying data between a data use unit that uses data and a data supply unit that supplies stored data in response to a request, a computer being instructed to execute the data relay program comprising: a history memory that stores history information of relayed data; a request analysis unit that, on receiving a data acquisition request from the data use unit, analyzes whether the data acquisition request is a data relay request or history information acquisition request, and extracts a data name from the data acquisition request when the data acquisition request is a data relay request, while extracting a data name, time, and a search method from the data acquisition request when the data acquisition request is a history information acquisition request; a data request unit that, when the data acquisition request is a data relay request, requests data corresponding to the data name extracted by the request analysis unit from the data supply unit and receives data sent from the data supply unit in response to the request; a history management unit that, when the data acquisition request is a data relay request, associatively stores the data received by the data request unit, the name of the data, and time when data relay processing was performed, in the history memory as history information, and outputs the data received by the data request unit, while, when the data acquisition request is a history information acquisition request, using the data name and time extracted by the request analysis unit to search the history memory for appropriate history information by the search method extracted by the request analysis unit and outputting data contained in the detected history information; and an output unit that outputs the output data located by the history management unit to the data use unit from which the data acquisition request was output.

If a data relay program stored in such a recording medium is executed by a computer, the functions of the above-mentioned data relay device of the present invention can be performed by the computer.

Also, to solve the above-mentioned problem, there is provided a computer-readable recording medium storing an information browsing program for relaying data to and from a server and accessing data on the server connected through a network via a data relay device, which associatively manages relayed data, a data name, and time as management information and sends back data contained in appropriate history information in response to a data acquisition request containing a data name, time, and a search method, a computer being instructed to execute the information browsing program comprising: a request unit that outputs a data acquisition request specifying a data name to the data relay device when accessing the most recent data on the server, while outputting a data acquisition request specifying a data name, time, and a search method when accessing data of history information stored in the data relay device; a data acceptance unit that receives data sent from the data relay device in response to the data acquisition request; and a display device that displays data received by the data acceptance unit on the screen of a display device.

If an information browsing program stored in such a recording medium is executed by a computer, the functions of the above-mentioned information terminal equipment of the present invention can be performed by the computer.

BRIEF DESCRIPTION OF THE DRAWINGS

FIG. 3 shows a data acquisition request sent from a client.

FIG. 4 shows a data acquisition request sent from a data relay device.

FIG. 5 shows an example of the contents of data offered from a WWW server.

FIG. 9 shows a data acquisition request intended to acquire history information.

FIG. 10 shows a data acquisition request intended to acquire history information of data to be inline-displayed.

FIG. 42 shows a data acquisition request sent from a client to acquire an image.

DESCRIPTION OF THE PREFERRED EMBODIMENTS

Hereinafter, embodiments of the present invention will be described with reference to the accompanying drawings.

Figure 1:
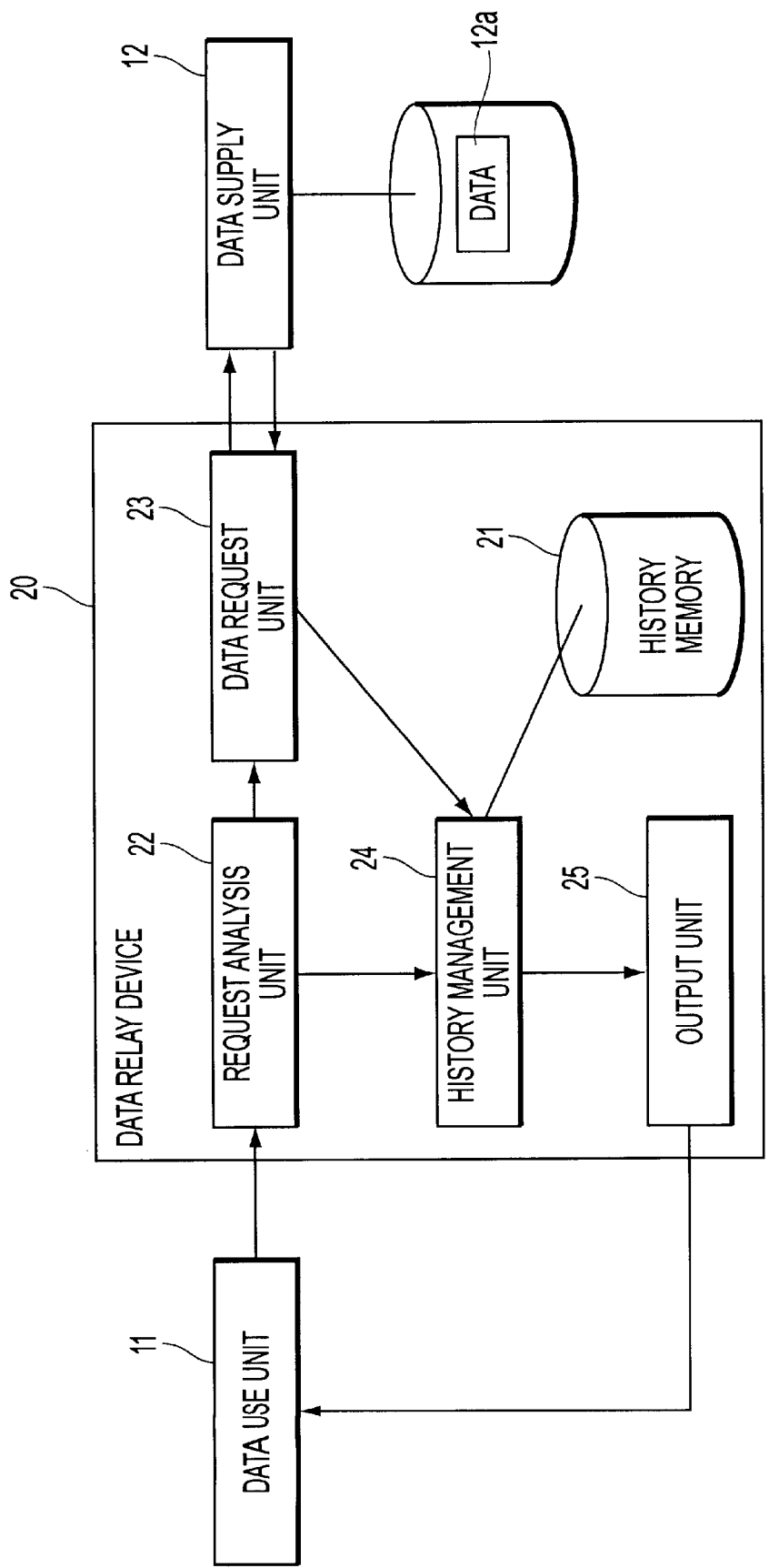
FIG. 1 shows a basic configuration of the present invention.

FIG. 1 shows a basic configuration of the present invention. A data relay device 20 of the present invention relays data between a data use unit 11 that uses requested data and a data supply unit 12 that supplies stored data 12a in response to a request.

The data relay device 20 comprises the elements described below.

A history memory 21 stores history information of relayed data.

A request analysis unit 22, on receiving a data acquisition request from the data use unit 11, analyzes whether the data acquisition request is a data relay request or a history information acquisition request. As a result of the analysis, if the data acquisition request is determined to be a data relay request, the request analysis unit 22 extracts a data name from the data acquisition request. If the data acquisition request is a history information acquisition request, the request analysis unit 22 extracts a data name, time, and a search method from the data acquisition request.

When the data acquisition request is a data relay request, a data request unit 23 requests data corresponding to the data name extracted by the request analysis unit 22 from the data supply unit and receives data sent from the data supply unit 12 in response to the request.

When the data acquisition request is a data relay request, a history management unit 24 associatively stores the data received by the data request unit 23, the name of the data, and time when data relay processing was performed, in the history memory 21 as history information, and outputs the data received by the data request unit 23. When the data acquisition request is a history information acquisition request, the history management unit 24 uses the data name and time extracted by the request analysis unit 22 to search the history memory 21 for appropriate history information by the search method extracted by the request analysis unit 22 and outputs data contained in the detected history information.

An output unit 25 outputs output data located by the history management unit 24 to the data use unit 11 from which a data acquisition request is outputted.

According to such a data relay device, when a history information acquisition request is received, history information is searched for in accordance with a search method specified in the data acquisition request. Accordingly, even if time for locating history information is not determined correctly, desired history information can be accessed by specifying an appropriate search method. An access sequence for information (page data on WWW servers, etc.) consisting of a plurality of pieces of data an is determined to some extent—data to be accessed appears first, and after the data is acquired, other data is acquired. Accordingly, if history information is accessed by specifying a search method with the access sequence in view, information consisting of a plurality of pieces of data can also be rebrowsed in the same state that it was browsed previously.

Hereinafter, embodiments of the present invention will be described using an example of accessing data on the Internet by means of a data relay device of the present invention.

Figure 2:
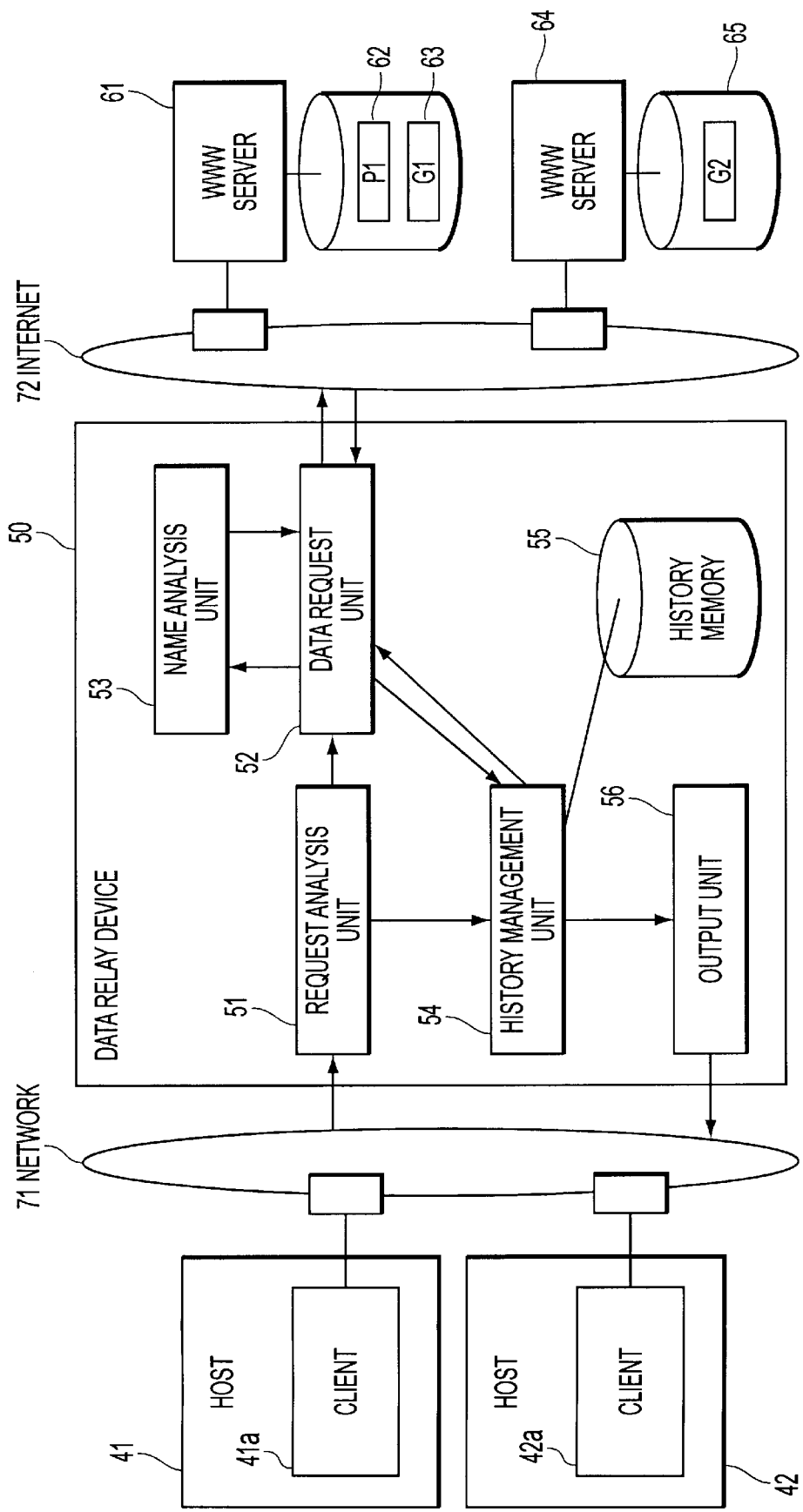
FIG. 2 shows a system configuration of a first embodiment of the present invention.

FIG. 2 is a system configuration diagram of a first embodiment of the present invention. This figure shows an example that clients 41a and 42a, which are WWW browsers, browse HTML (Hyper Text Markup Language) documents stored in WWW servers 61 and 64 existing on the Internet 72 through a data relay device 50 according to the present invention.

In the figure, a plurality of hosts 41 and 42 are connected to a data relay device 50 through a network 71. The data relay device 50 is connected to a plurality of WWW servers 61 and 64 through the Internet 72.

In hosts 41 and 42, clients 41a and 42a, which are WWW browsers, are executed. The clients 41a and 42a request data to the data relay device 50 and accept the requested data. The accepted data is displayed on the screen by the clients 41a and 42a.

The data relay device 50 consists of the following elements.

A request analysis unit 51 determines whether a data acquisition request from hosts 41 and 42 is a data relay request or a history information acquisition request. If it is a data relay request, the request analysis unit 51 extracts a data name from the data acquisition request. If it is a history information acquisition request, the request analysis unit 51 extracts a data name, time, a search method, and a processing method (failure-time processing method) for unsuccessful search from the data acquisition request.

If a data acquisition request is a data relay request, a data request unit 52 receives a data name extracted by the request analysis unit 51. If the data name is inputted, the data request unit 52 inputs the data name to the name analysis unit 53. The data request unit 52 requests data corresponding to the data name extracted by the request analysis unit 51 from a server corresponding to an identifier returned from the name analysis unit 53 and receives data from the WWW server.

A name analysis unit 53 analyzes a data name inputted from the data request unit 52 and returns the identifier of a WWW server from which to request data corresponding to the name.

A history management unit 54, when a data acquisition request is a data relay request, stores the contents of data received by the data request unit 52 in a history memory 55 as history information associatively with a data name thereof and time when a client sent the request. A history management unit 54 outputs data received by the data request unit 52. When the data acquisition request is a history information acquisition request, the history management unit 54 searches data stored in the history memory 55 for history information matching a data name and time specified by the data acquisition request by a search method specified by the data acquisition request, and outputs search results as output data. At this time, if appropriate history information cannot be detected, processing is performed in accordance with a failure-time processing method contained in the data acquisition request.

The history memory 55 associatively stores the name and contents of data relayed by the data relay device 50 and time when a client sent the request, as history information.

An output unit 56 outputs the contents of output data located by the history management unit 54 to a client.

Servers 61 and 64 store and manage data contents along with other information. The WWW server 61 stores data 62 and 63 and the WWW server 64 stores data 65. The respective names of the data 62, 63, and 65 are "url1", "url2", and "url3". The respective contents of the data 62, 63, and 65 are HTML document "P1", image "G1", and image "G2".

A description will be made of a case where users using client 41a reference data 62 named "url1" stored in the WWW server 61 in a system thus configured. The data 62 contains a description that data 63 and 65 are to be inline-displayed, and constitutes a page corresponding to "url1" along with images "G1" and "G2" contained in the data 63 and 65.

First, a data acquisition request described below is sent from client 41a.

FIG. 3 shows a data acquisition request sent from a client. The data acquisition request 81 contains header information sent by HTTP (Hyper Text Transfer Protocol) from client 41a. The description of the first line shows that data named "url1" is acquired by HTTP version 1.1. The second line "request-time:" indicates time when the client 41a sent the data acquisition request 81. In this example, the time when the client 41a sent the data acquisition request is treated as browsing time that is to be added to history information by the data relay device 50 and stored therein.

On receiving the data acquisition request 81, the request analysis unit 51 of the data relay device 50 analyzes it to determine whether it is a data relay request or a history information acquisition request. In this example, since time specified by "request-time:" is contained, the request analysis unit 51 determines that it is a data relay request, and passes the data name "url1" to the data request unit 52. The data name "url1" and time "T11" are passed to the history management unit 54. The data request unit 52 inputs the received data name "url1" to the name analysis unit 53. The name analysis unit 53 returns the identifier of a WWW server 61 storing data 62 associated with the data name "url1" to the data request unit 52. Using the received identifier, the data request unit 52 sends the following data acquisition request to the WWW server 61.

FIG. 4 shows a data acquisition request sent from the data relay device. The data acquisition request 82 is the data acquisition request 81 shown in FIG. 3 from which time specified by "request-time:" is excluded.

On receiving the data acquisition request 82, the WWW server 61 returns data corresponding to the data name "url1".

FIG. 5 shows an example of data supplied from the WWW server. The data 62 is an HTML document in which two <IMG> tags 62a and 62b are provided. In the <IMG> tag 62a, the data name "url2" of data 63 is specified by URL with SRC attribute. In the IMG tag 62b, the data name "url3" of data 65 is specified by URL with SRC attribute. Image data 63 and 65 are inline-displayed by the <IMG> tags 62a and 62b.

On receiving the data 62, the data request unit 52 of the data relay device 50 passes the data 62 to the history management unit 54. The history management unit 54 associatively stores the time "T11", the contents "P1" of the data 62, and the data name "url1" in the history memory 55, and passes the data 62 to the output unit 56. The output unit 56 returns the data 62 to the client 41a.

The client 41a analyzes the contents of the returned data 62 and checks whether the name of other data is contained therein. If contained, the client 41a sends a data acquisition request with respect to the name of each data. In this example, since the names "url2" and "url3" of image data 63 and 65 to be inline-displayed are contained in the data 62, the client 41a extracts the names "url2" and "url3" of two pieces of data 63 and 65 and requests an image corresponding to the name of the data to the data relay device 50. The time when data acquisition requests with respect to "url2" and "url3" are to be sent is defined to be "T12" and "T13" (T12<T13), respectively.

First, the client 41a issues a data acquisition request corresponding to "url2" to the data relay device 50 at time "T12". The data acquisition request is sent to the WWW server 61 and the data 63 of image "G1" is sent back to the data relay device 50 from the WWW server 61. On receiving the data 63, the data relay device 50 associatively stores time "T12", the data name "url2", and data contents "G1" in the history memory 55, and returns the data 65 to the client 41a.

In the same way, the client 41a requests data 65 corresponding to "url3" from the data relay device 50 at time "T13". As a result, the data 65 of an image "G2" corresponding to "url3" is returned from the WWW server 64. On receiving the data 65, the data relay device 50 associatively stores time "T13", the data name "url3", and data contents "G2" in the history memory 55, and returns the data 65 to the client 41a.

As a result, history information shown below is stored in the history memory 55 of the data relay device 50.

Figure 6:
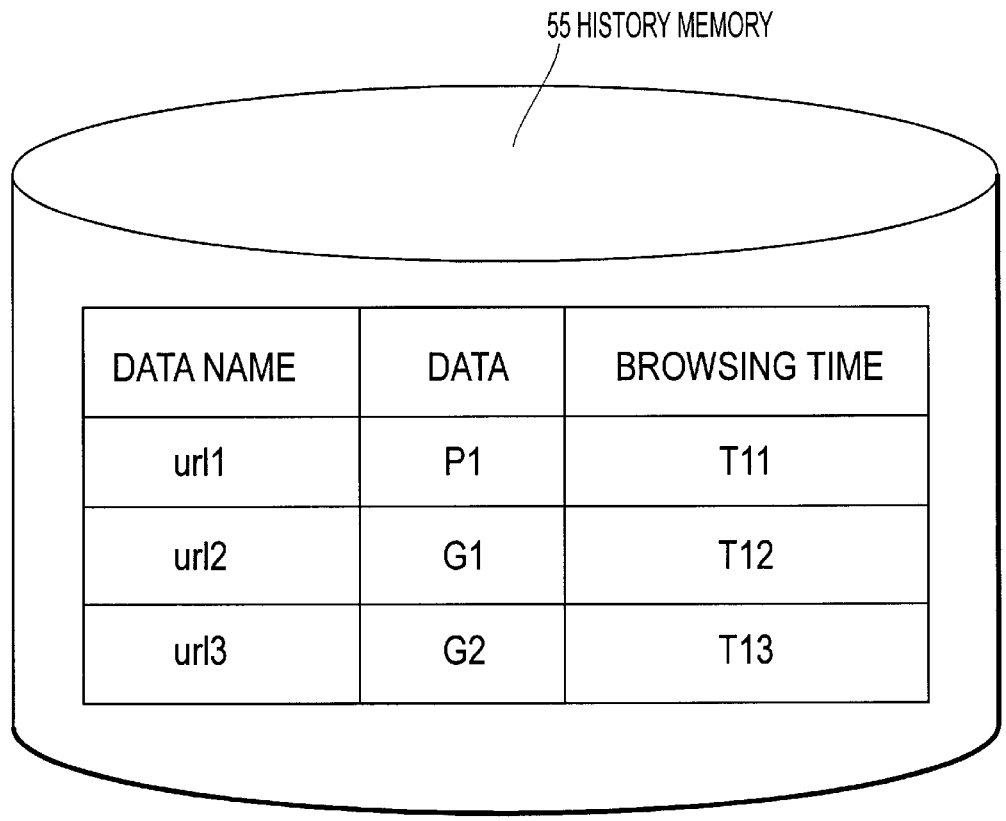
FIG. 6 shows history information stored in a history memory.

FIG. 6 shows history information stored in the history memory. Thus, the contents of data and time (browsing time) corresponding to each of "url1", "url2", and "url3" are stored. Among time "T11", "T12", and "T13" is satisfied the following relation: T11<T12<T13 (T13 is the last time of browsing).

The client 41a displays data 62, 63, and 65 as a page corresponding to the data name "url1". An example of a screen at this time will be described below.

Figure 7:
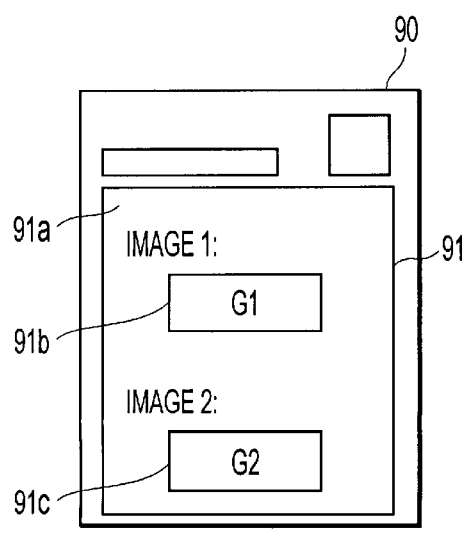
FIG. 7 shows an example of a screen displayed by a client.

FIG. 7 shows an example of a screen displayed by a client. The screen 90 has a data contents display unit 91 in which the contents 91*a* of data 62 are displayed. In the contents 91*a* of data 62 are displayed the image 91*b* of data 63 and the image 91*c* of data 65 that are to be inline-displayed.

The above processing is performed in time sequence, as described below.

Figure 8:
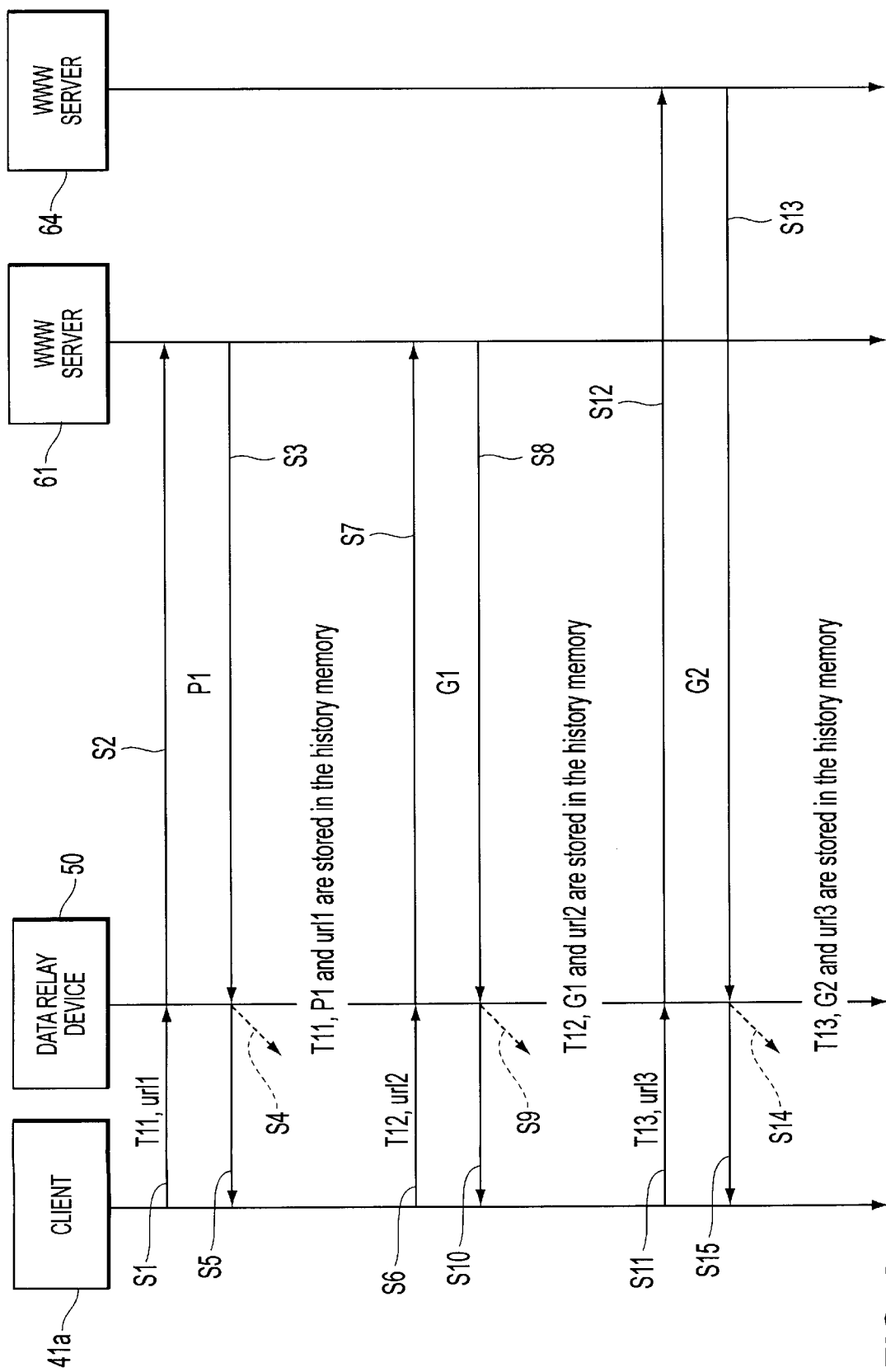
FIG. 8 shows a procedure for acquiring data from a WWW server.

FIG. 8 shows the procedure for acquiring data from WWW servers.

[S1] When a user enters a data name to a client 41*a*, time "T11" and a data name "url1" are sent as a data acquisition request to the data relay device 50.

[S2] In the data relay device 50, a request analysis unit 51 analyzes the contents of the received data name. When it is determined that the request is a data relay request, the data name "url1" is passed to the data request unit 52. The data request unit 52 requests data 62 to a WWW server 61.

[S3] The WWW server 61 returns the requested data 62 to the data relay device 50.

[S4] In the data relay device 50, the data request unit 52 receives the data 62 sent from the WWW server 61 and passes it to a history management unit 54. The history management unit 54 associates the contents "P1" of the received data 62 with the data name "url1" and time "T11" and stores them in a history memory 55.

[S5] An output unit 56 of the data relay device 50 receives the data 62 from the history management unit 54 and supplies it to the client 41*a* within a host 41. The contents of the supplied data 62 are displayed on the screen of the client 41*a*.

[S6] The client 41*a* analyzes the contents of the data 62 and extracts the names "url2" and "url3" of two pieces of data that are to be inline-displayed, and sends time "T12" and a data name "url2" as a data acquisition request to the data relay device 50.

[S7] In the data relay device 50, the same processing as in the above step S2 is performed and a request for data 63 is issued to the WWW server 61.

[S8] The WWW server 61 returns the requested data 63 to the data relay device 50.

[S9] In the data relay device 50, the data request unit 52 receives data 63 sent from the WWW server 61 and passes it to the history management unit 54. The history management unit 54 associates the contents "G1" of the received data 63 with the data name "url2" and time "T12" and stores them in the history memory 55.

[S10] The output unit 56 of the data relay device 50 receives data 63 from the history management unit 54 and supplies the data 63 to the client 41*a* within the host 41. The contents "G1" of the supplied data 63 are displayed on the screen of the client 41*a*.

[S11] To acquire data for the data name "url3" extracted in step S6, the client 41*a* sends time "T13" and the data name "url3" to the data relay device 50 as a data acquisition request.

[S12] In the data relay device 50, the same processing as in the above step S2 is performed and a request to acquire data 65 is issued to the WWW server 64.

[S13] The WWW server 64 returns requested data 65 to the data relay device 50.

[S14] In the data relay device 50, the data request unit 52 receives data 65 sent from the WWW server 64 and passes it to the history management unit 54. The history management unit 54 associates the contents "G2" of the received data 65 with the data name "url3" and time "T13" and stores them in the history memory 55.

[S15] The output unit 56 of the data relay device 50 receives data 65 from the history management unit 54 and supplies the data 65 to the client 41*a* within the host 41. The contents "G2" of the supplied data 65 are displayed on the screen of the client 41*a*.

Next, a description will be made of a case where the client 41*a* issues a history information acquisition request. A user sends the following data acquisition request from the client 41*a* to search for data 62 browsed at time "T11".

FIG. 9 shows a data acquisition request issued to acquire history information. The first line of the data acquisition request 83 is the same as the one in the example of FIG. 3 described previously.

"version-time:" on the second line indicates time when the data was browsed previously.

"search-direction:" on the third line indicates a search method. "backward" specified in "search-direction:" denotes a search method by which data corresponding to "url1" that was browsed immediately before "T11" is searched for, when the history memory 55 does not store data corresponding to the data name "url1" and time "T11" indicating browsing time.

"auto-fetch-on-failure:" on the fourth line specifies action for an unsuccessful search. "true" specified in "auto-fetch-on-failure:" denotes that, when a search failed, a data acquisition request for current data corresponding to a specified data name is sent to a WWW server.

Although an example of specifying "backward" in "search-direction:" is described here, other search methods can be specified.

For example, when "forward" is specified in "search-direction:", if the history memory 55 does not store data corresponding to "url1" and "T11", there is specified a search method by which data corresponding to "url1" that was browsed immediately after "T11" is searched for.

When "backward-forward" is specified in "search-direction:", if the history memory 55 does not store data corresponding to "url1" and "T11", there is specified a search method by which data corresponding to "url1" that was browsed immediately before "T11" is searched for, and if it cannot be searched for, data corresponding to "url1" that was browsed immediately after "T11" is searched for.

When "forward-backward" is specified in "search-direction:", if the history memory 55 does not store data corresponding to "url1" and "T11", there is specified a search method by which data corresponding to "url1" that was browsed immediately after "T11" is searched for, and if it cannot be searched for, data corresponding to "url1" that was browsed immediately before "T11" is searched for.

Although a description will be made of an example that "true" is specified in "auto-fetch-on-failure:", another method can also be specified.

For example, when "false" is specified in "auto-fetch-on-failure:", even if a search fails, a data acquisition request for current data is not sent to a WWW server.

If a description of "auto-fetch-on-failure:" is not contained in a header, it is also permissible not to send a data acquisition request for current data to a WWW server.

On receiving a data acquisition request 83 of FIG. 9, the request analysis unit 51 of the data relay device 50 analyzes it. Since time specified by "version-time:" is contained, the request analysis unit 51 recognizes that the request is a history information acquisition request. It extracts the data name "url1", time "T11", search method specification "backward", and search-failure-time action specification "true", and passes them to the history management unit 54.

The history management unit 54 searches history information with a data name of "url1" for history information having time "T11" set as browsing time. If there is no matching history information, the history management unit 54 extracts history information with time earlier than "T11" that is closest to "T11", of the history information with a data name of "url1". In this example, since there is history information with time of "T11", the data 62 corresponding to time "T11" and a data name "url1" is extracted and returned to the client 41a by the output unit 56.

The client 41a analyzes the data 62 returned from the data relay device 50 and extracts the name of data required to display the contents of the data 62 as one completed page. In this example, the client 41a extracts "url2" and "url3" to be inline-displayed.

To request the data 63 corresponding to the data name "url2" from the data relay device 50, the client 41a generates the next data acquisition request by specifying time "T11", the data name "url2", and a search method "forward" and sends it to the data relay device 50.

FIG. 10 shows a data acquisition request for acquiring the history information of data to be inline-displayed. In the data acquisition request 84, "forward" is specified as "search-direction:". The reason is that, as apparent from FIG. 8, "G1" data 63 and "G2" data 65 are always browsed later than "P1" data 62.

On receiving a data acquisition request 84, the request analysis unit 51 of the data relay device 50 extracts the data name "url2", time "T11", search method specification "forward", and search-failure-time action specification "true", and passes them to the history management unit 54. The history management unit 54 searches history information (shown in FIG. 6) stored in the history memory 55 for history information corresponding to the data name "url2" and time "T11". Since no corresponding history information is stored in this example, history information is searched for according to the specified search method "forward". As a result, as data corresponding to the data name "url2" that was browsed immediately after "T11", the data 63 of image "G1" browsed at "T12" is detected. Accordingly, the history management unit 54 extracts the data 63 and passes it to the output unit 56. The output unit 56 returns the data 63 containing the image "G1" to the client 41a.

At this time, if data browsed later than time "T11" cannot be searched for, since "true" is specified in "auto-fetch-on-failure:", the data name "url2" is sent to the data request unit 52 from the history management unit 54. The data request unit 52 acquires the identifier of the WWW server 61 and sends a data acquisition request for the data 63 to the WWW server 61 (subsequent processing is the same as data relay processing).

Similarly, the client 41a sends a data acquisition request for the data 65 corresponding to the data name "url3" to the data relay device 50 and acquires the data 65 of image "G2".

As a result, the screen 90 shown in FIG. 7 is displayed in the client 41a.

In this way, the user can acquire all data (data 62, 63, 65) required to display a page corresponding to "url1" by means of browsing time "T11" and the data name "url1".

Although the first data is searched for with "backward" in this example, it can also be searched for with "forward".

Next, a second embodiment will be described. In the second embodiment, to perform a search, time contained in a data acquisition request is corrected by time correction information stored in advance in the data relay device.

Figure 11:
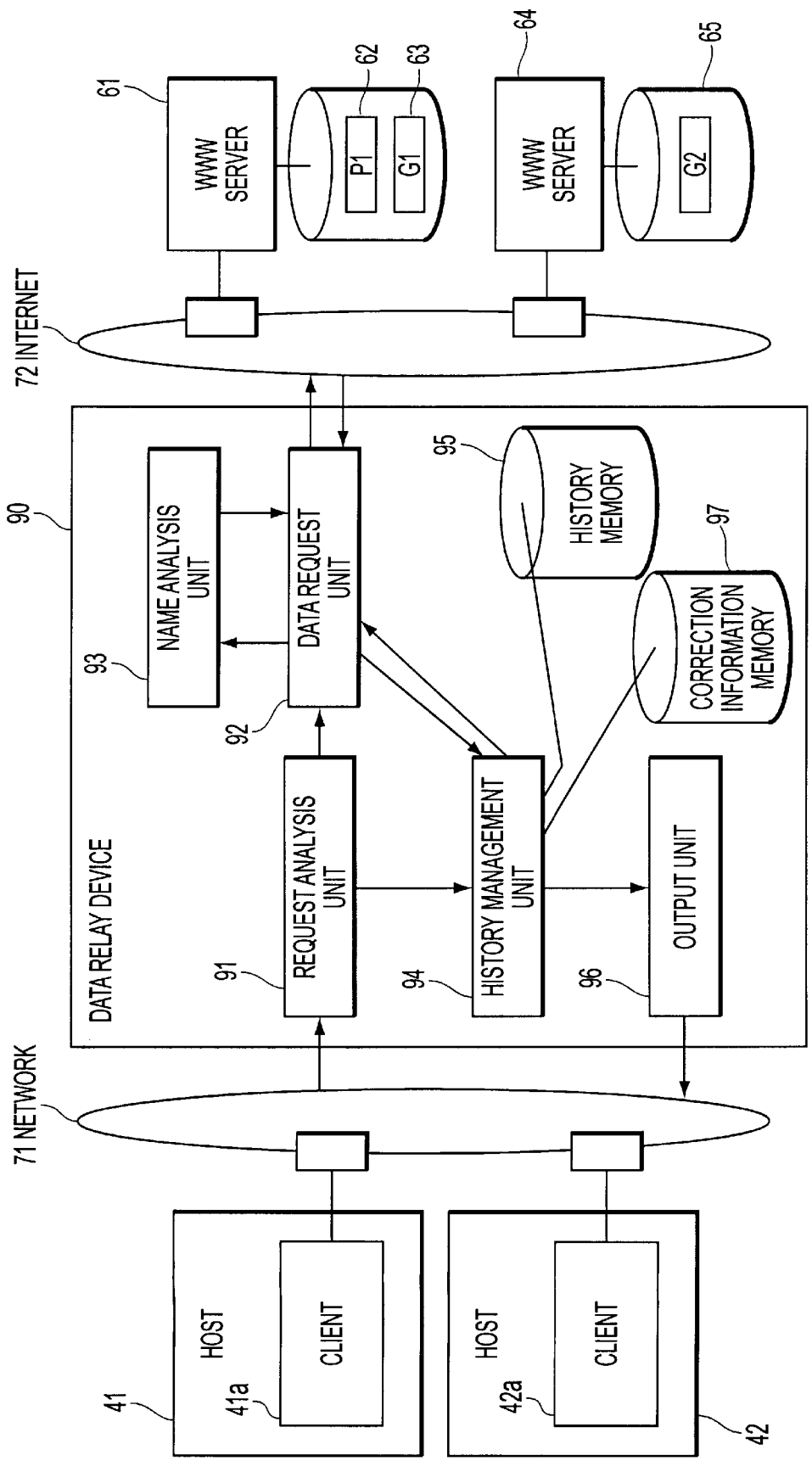
FIG. 11 shows a system configuration of a second embodiment of the present invention.

FIG. 11 is a system configuration diagram of the second embodiment of the present invention. Since the configuration in this example is the same as the one in the first embodiment except for a data relay device 90, the same reference numerals are assigned to the same elements, a description of which will be omitted (this is also true for other embodiments described later).

The data relay device 90 comprises a request analysis unit 91, a data request unit 92, a name analysis unit 93, a history management unit 94, a history memory 95, an output unit 96, and a correction memory 97. Of these units, the request analysis unit 91, the data request unit 92, the name analysis unit 93, the history memory 95, and the output unit 96 have the same functions as the elements of the same names in the first embodiment shown in FIG. 2. Other elements have the functions described below.

The history management unit 94 has the function to correct time at the time of a history information acquisition request, in addition to the function of the history management unit 54 shown in FIG. 2. In other words, time extracted by the request analysis unit 91 is corrected according to correction information stored in the correction memory 97 and history information is searched for using the corrected time.

The correction memory 97 stores correction information stored in advance. The correction information specifies what correction processing to perform.

A description will be made of a case where, in a system thus configured, a user using a client 41a references data 62 named "url1" that is stored in a WWW server 61. Image "G1" and "G2" are inline-displayed in the data 62.

The client 41a sends a data relay request as a data acquisition request according to the same procedure as in the first embodiment.

A description will be made of a case where the client 41a issues a history information acquisition request. To search for the data 62 browsed at time "T11", the user sends the following data acquisition request from the client 41a.

Figure 12:
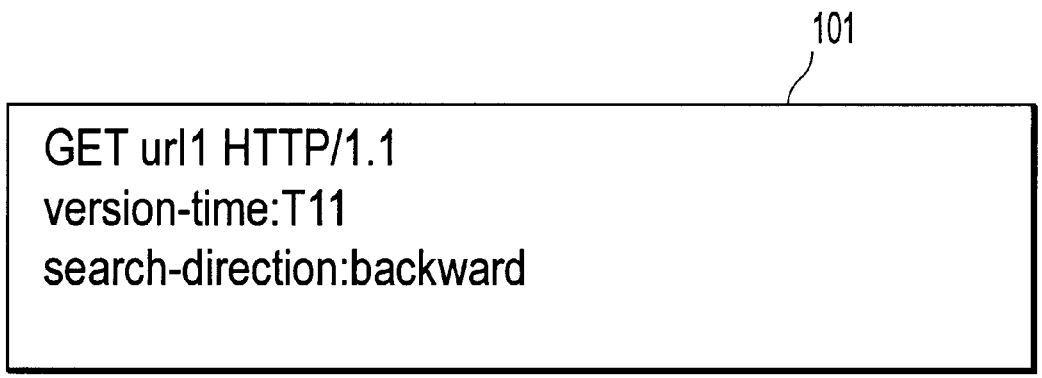
FIG. 12 shows a data acquisition request sent from a client.

FIG. 12 shows a data acquisition request sent by a client. Although the data acquisition request 101 has almost the same contents as the data acquisition request 83 shown in FIG. 9, "auto-fetch-on-failure:" is not specified.

When the data relay device 90 receives the data acquisition request 101, the request analysis unit 91 recognizes that the request is a history information acquisition request because time is specified by "version-time". The request analysis unit 91 extracts the data name "url1", time "T11", and search method specification "backward" and passes them to the history management unit 94. When the history management unit 94 searches for history information stored in the history memory 95, it corrects time by correction information stored in the correction memory 97 and performs the search by a pair of the corrected time and the data name "url1" sent from the client 41a.

For example, it is assumed that correction information stored in the correction memory 97 specifies browsing time plus 10 minutes. In this case, the history management unit 94 generates time "T11a", which denotes time "T11" plus 10 minutes. At this time, it is assumed that the following relation is satisfied: T11<T12<T13<T11a. As seen from the above, it is preferable to define correction information so that a value larger than time required to display the entire page is added to rebrowsing time.

The history management unit 94 performs a search by the corrected time "T11a" and the data name "url1". Since information stored in the history memory 95 is the same as that in the first embodiment, the data relay device 90 returns the data 62 having contents of "P1" to the client 41a.

Similarly, the client 41a sends the following data acquisition request for the name "url2" of data to be inline-displayed, contained in the data 62.

Figure 13:
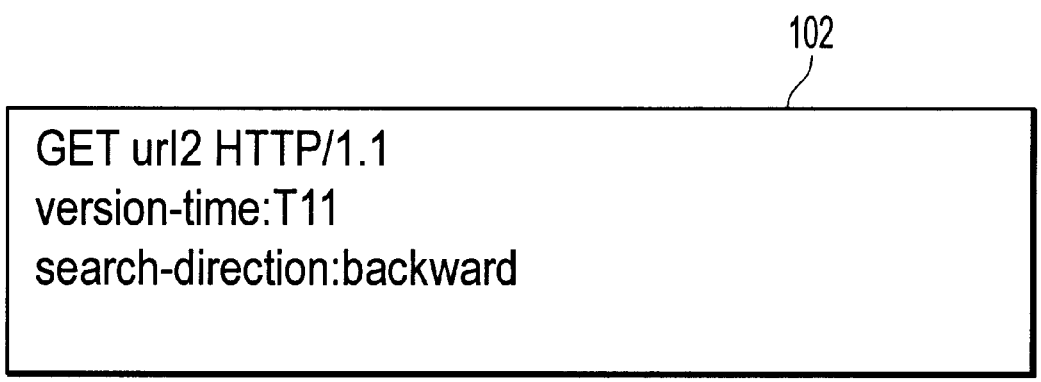
FIG. 13 shows a request to acquire data to be inline-displayed.

FIG. 13 shows a data acquisition request for data to be inline-displayed. The data acquisition request 102 is the same as the data acquisition request 101 shown in FIG. 12, except that the name of data to be acquired is "url2".

When the data relay device 90 receives the data acquisition request 101, the request analysis unit 91 recognizes that the request is a history information acquisition request because time is specified by "version-time". The request analysis unit 91 extracts the data name "url2", time "T11", and search method specification "backward" and passes them to the history management unit 94. The history management unit 94 performs a search by time "T11a", which is equal to time "T11" plus 10 minutes, and the data name "url2". Since T12<T11a in this example, the data relay device 90 returns data 63 containing an image "G1" to the client 41a.

When T12>T11a, the history management unit 94 tells the client 41a that it cannot search for data 63 corresponding to the data name "url2".

Similarly, the client 41a sends a data acquisition request for data 65 named "url3" and receive the data 65 of an image "G2" from the data relay device 90.

In this way, if proper correction information is stored in advance in the correction memory 97 and "backward" is specified as a search method, users can search for all data (data 62, 63, and 65) required to display a page corresponding to "url1" by specifying time "T11" and the data name "url1".

Next, a description will be made of a third embodiment. The third embodiment automatically calculates correction information set in a data relay device.

In the second embodiment, a description was made of an example that the data relay device 90 stores in advance correction information. However, when the data relay device 90 failed in a data acquisition request to a WWW server, time required from transmission of the request to notification of failure can also be used as correction information. Such an example will be described below.

Figure 14:
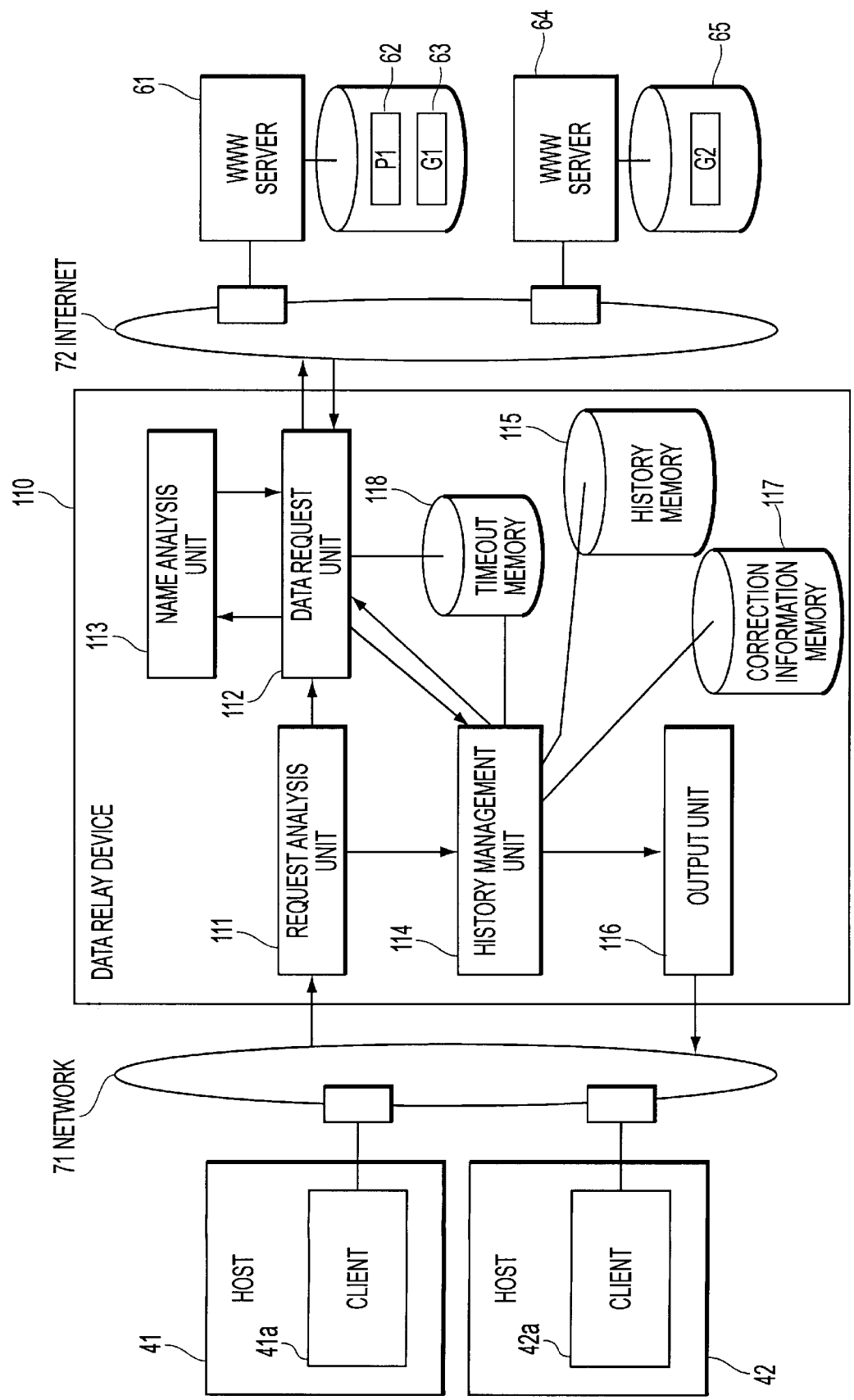
FIG. 14 shows a system configuration of a third embodiment of the present invention.

FIG. 14 shows a system configuration of the third embodiment of the present invention.

The data relay device 110 in the third embodiment comprises a request analysis unit 111, a data request unit 112, a name analysis unit 113, a history management unit 114, a history memory 115, an output unit 116, and a correction memory 117, and a timeout time memory 113. Of these units, the request analysis unit 111, the name analysis unit 113, the history memory 115, the output unit 116, and the correction memory 117 have the same functions as the elements of the same names in the second embodiment shown in FIG. 11. Other elements have the functions described below.

In addition to the function of the data request unit 92 shown in FIG. 11, the data request unit 112 has the following function: when a data acquisition request to a WWW server fails, it stores time required from transmission of the request to notification of failure in the timeout time memory 118 as timeout time.

Although the history management unit 114 has the same function as that of the history management unit 94 shown in FIG. 11, it can find the average of timeout time stored in the timeout time memory 118 and correct time at the time of a history information acquisition request by the average.

The timeout time memory 118 stores timeout time sent from the data request unit associatively with request transmission time.

In a system thus configured, for example, when the data relay device 110 fails in a data acquisition request to the WWW server 61, time when the request was sent to the WWW server 61 and time required from transmission of the request to notification of failure are stored as timeout time in the timeout time memory 118. Presently, it is assumed that the timeout time memory 118 stores data described below.

Figure 15:
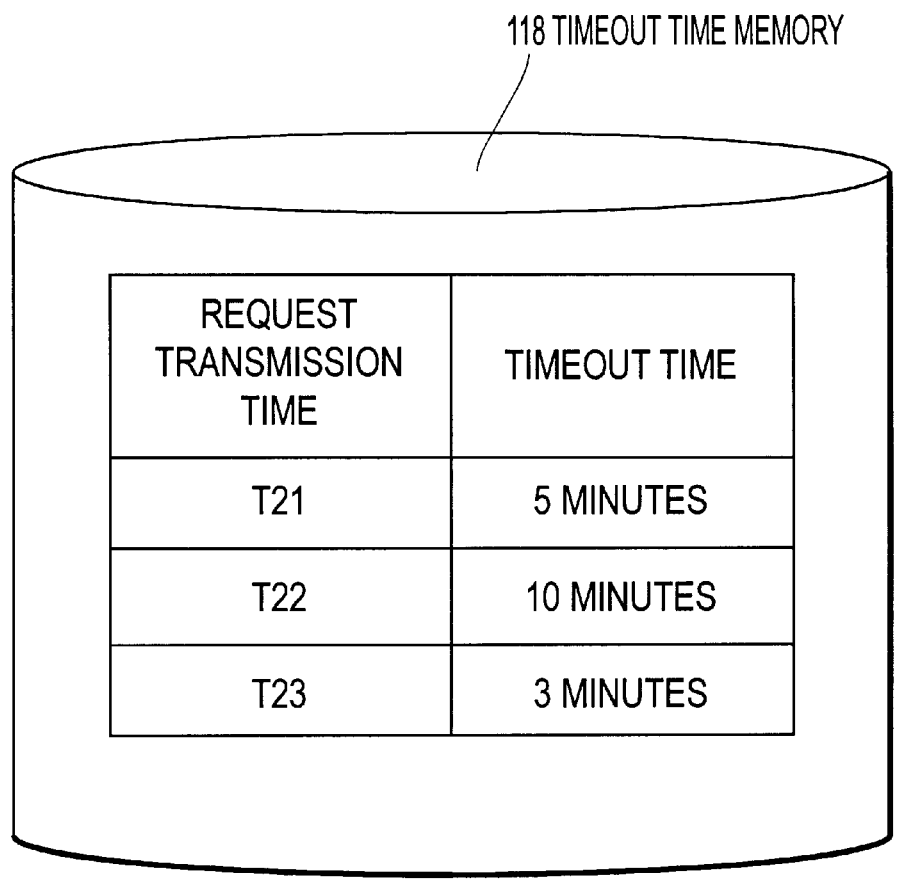
FIG. 15 shows an example of the contents of a timeout time memory unit.

FIG. 15 shows an example of the contents of the timeout time memory. In this example, 5, 10, and 3 minutes are stored as timeout time.

It is assumed that the correction memory 117 stores correction information indicating that the average of timeout time is added to browsing time.

Here, a description will be made of a case where the client 41a issues a history information acquisition request. It is assumed that the history memory 115 stores the same information as in the first embodiment (shown in FIG. 6). To search for the data 62 named "url1" that was browsed at time "T11", the user sends the following data acquisition request from the client 41a.

Figure 16:
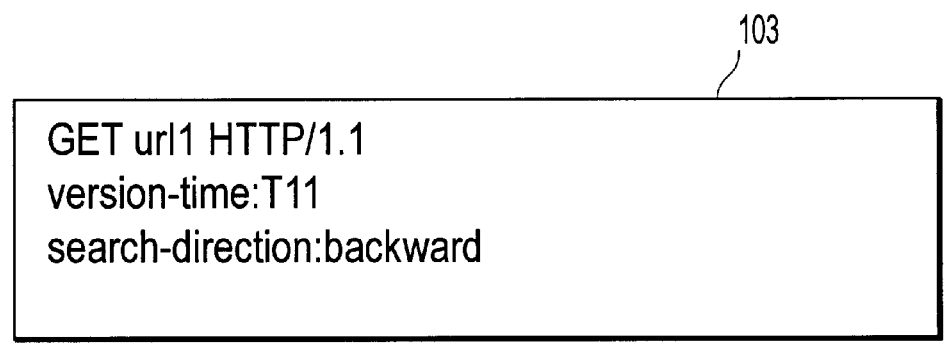
FIG. 16 shows a data acquisition request sent from a client.

FIG. 16 shows a data acquisition request sent by a client. The data acquisition request 103 has the same contents as shown in FIG. 12.

When the data relay device 110 receives the data acquisition request, the request analysis unit 111 recognizes that the request is a history information acquisition request because time is specified by "version-time". The request analysis unit 111 extracts the data name "url1", time "T11", and search method specification "backward" and passes them to the history management unit 114. The history management unit 114 searches for history information stored in the history memory 115. At this time, it corrects time by correction information stored in the correction memory 117 and performs the search by a pair of the corrected time and the data name "url1" sent from the client 41a. Since the correction information stored in the correction memory 117 specifies that the average of timeout time is added to browsing time, the average of timeout time stored in the timeout time memory 118 is calculated. In this example, the average of timeout time is six minutes.

The history management unit 114 adds six minutes to "T11" to correct time contained in the data acquisition request and generates new time "T11b". In this example, it is assumed that the following relation is satisfied: T11<T12<T13<T11b.

The history management unit 114 performs a search by the time "T11b" and the data name "url1". Since the history memory 115 stores the same information as in the first embodiment (shown in FIG. 6), the data relay device 110 returns the data 62 having contents of "P1" to the client 41a.

In this way, the user can search for data browsed previously by correcting time by timeout time.

Although a rule "the average of timeout time is added to browsing time" was used here as correction information, other rules using timeout time may also be used as correction information. For example, rules "the maximum of timeout time is added to browsing time" and "the timeout time of request transmission time closest to browsing time is added to browsing time" can also be specified as correction information.

Next, a fourth embodiment will be described. In the fourth embodiment, time is corrected using time necessary for the data relay device to acquire data from the WWW server.

In the example described previously, when the data relay device failed in a data acquisition request to a WWW server, time required from transmission of the request to notification of failure was used as correction information. Here, a description will be made of an example that time necessary for the data relay device to acquire information is used as correction information.

Figure 17:
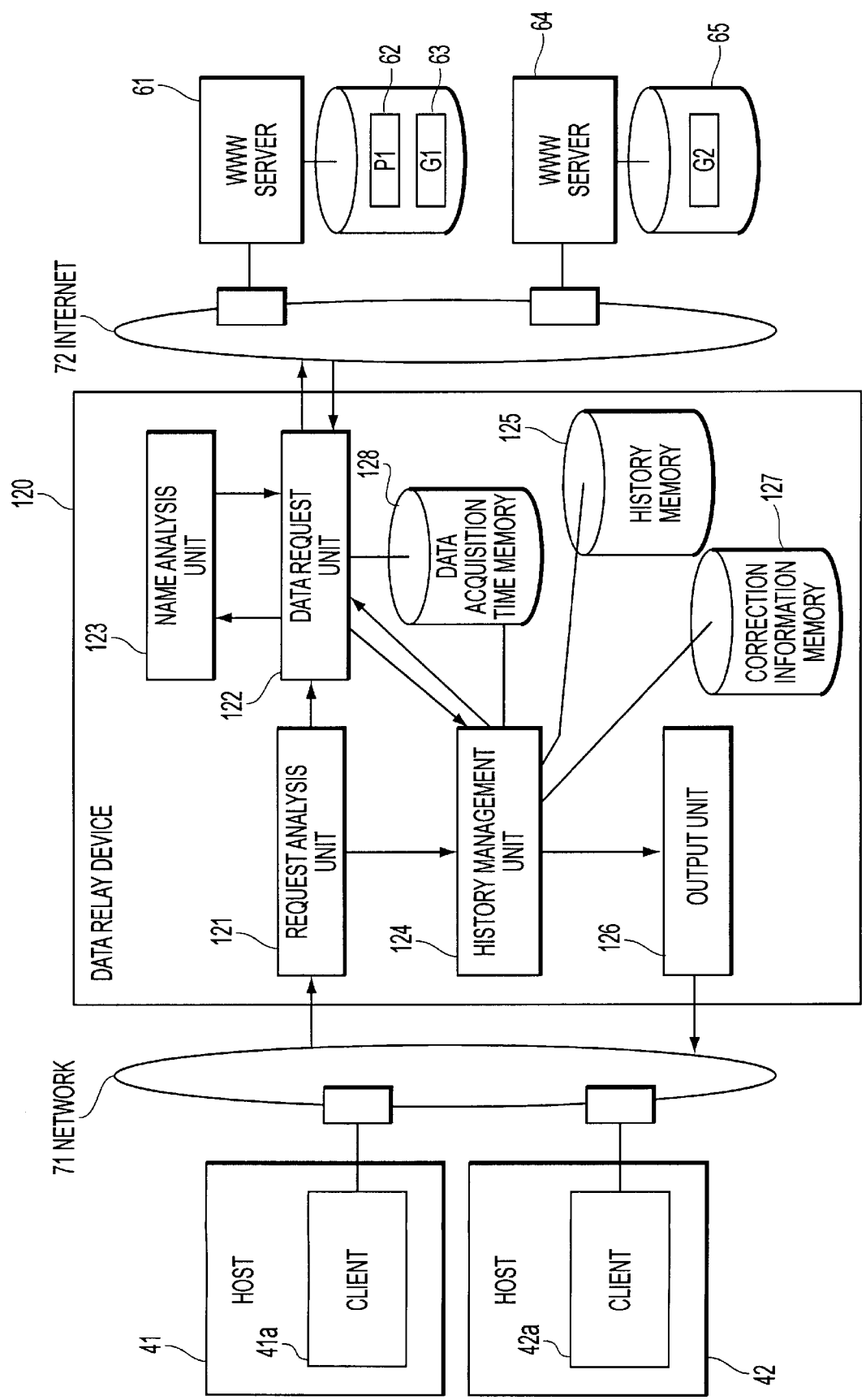
FIG. 17 shows a system configuration of a fourth embodiment of the present invention.

FIG. 17 shows a system configuration of the fourth embodiment of the present invention.

The data relay device 120 in the fourth embodiment comprises a request analysis unit 121, a data request unit 122, a name analysis unit 123, a history management unit 124, a history memory 125, an output unit 126, and a correction memory 127, and a data acquisition time memory 128. Of these units, the request analysis unit 121, the name analysis unit 123, the history memory unit 125, the output unit 126, and the correction memory unit 127 have the same functions as the elements of the same names in the second embodiment shown in FIG. 11. Other elements have the functions described below.

In addition to the function of the history management unit 92 shown in FIG. 11, the data request unit 122 has the following function: when a data acquisition request is sent to a WWW server and data corresponding to the data acquisition request is received from the WWW server, time when the data acquisition request was sent and time from transmission of the request to reception of data are stored in the data acquisition time memory unit 128 as data acquisition time.

The history management unit 124 has the same function as that of the history management unit 94 shown in FIG. 11, but it can search for data acquisition time stored in the data acquisition time memory unit 118 and correct time during a history information acquisition request by the maximum of the acquired data acquisition time.

The data acquisition time memory unit 128 stores the time it took for the data relay device 120 to acquire data for each data acquisition request from clients.

It is assumed that the data acquisition time memory unit 128 stores the following data.

Figures 18, 19:
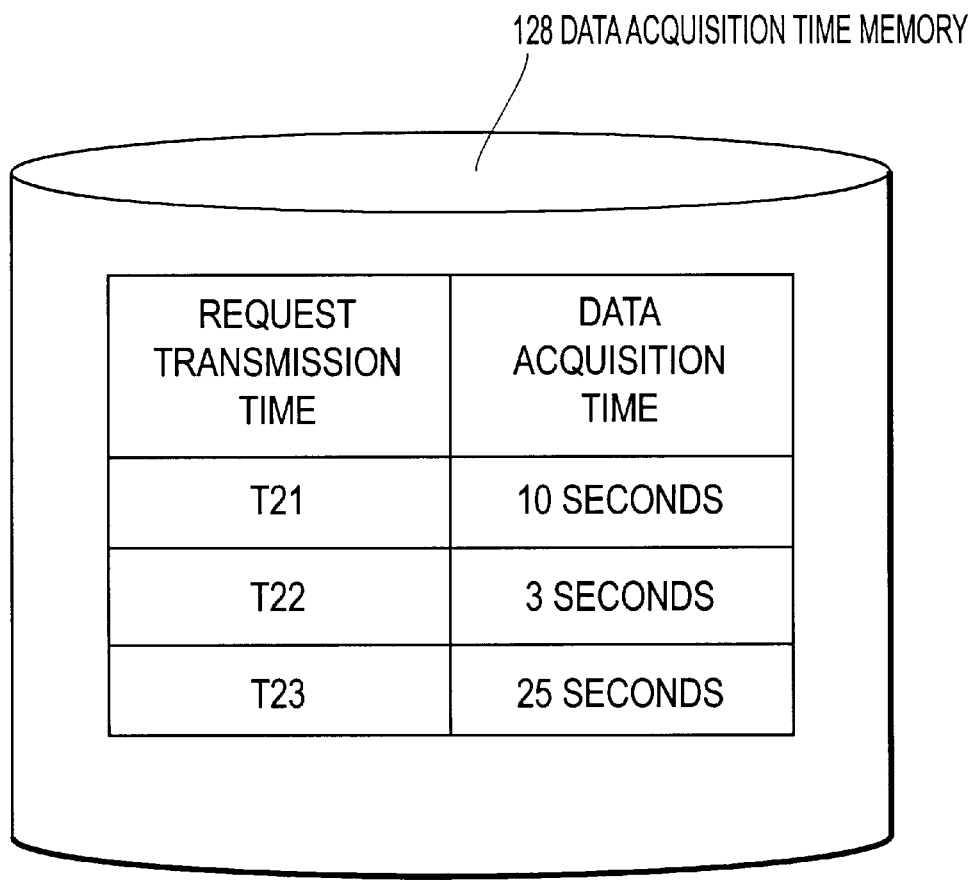
FIG. 18 shows data stored in a data acquisition request memory.
FIG. 19 shows a data acquisition request containing correction information.

FIG. 18 shows data stored in the data acquisition request memory unit. In this example, data acquisition time 10, 3, and 25 seconds are stored.

Correction information stored in the correction memory 127 specifies that the maximum of data acquisition time is added to browsing time.

A description will be made of a case where a client 41a issues a history information acquisition request in such a state. It is assumed that the history memory 125 stores the same information as that in the first embodiment. To search for data 62 of "url1" browsed at time "T11", a user sends from the client 41a the same data acquisition request as shown in FIG. 12.

When the data relay device 120 receives the data acquisition request, the history management unit 124 searches for data stored in the history memory 125. At this time, it corrects time by correction information stored in the correction memory 127 and performs the search by a pair of the corrected time and the data name "url1" sent from the client 41a. Since the correction information stored in the correction memory 127 specifies that the maximum of data acquisition time is added to browsing time, the maximum of data acquisition time stored in the data acquisition time memory 128 is searched for. As apparent from FIG. 18, the maximum of data acquisition time is 25 seconds.

To correct browsing time contained in the data acquisition request, the history management unit 124 adds 25 seconds to "T11" and generates "T11b". It is assumed that T11<T12<T13<T11b.

The history management unit 124 performs a search by the time "T11b" and the data name "url1". In this example, since the history memory 125 stores the same information as that in the first embodiment (shown in FIG. 6), the data relay device 120 returns the data 62 having contents "P1" to the client 41a.

In this way, the user can search for data browsed previously by correcting browsing time by data acquisition time.

Although a rule "the maximum of data acquisition time is added to browsing time" was used here as correction information, other rules using data acquisition time may also be used as correction information. For example, rules "the average of data acquisition time is added to browsing time" and "the data acquisition time of request transmission time closest to browsing time is added to browsing time" can also be specified as correction information.

Next, a description will be made of a fifth embodiment. In the fifth embodiment, correction information is sent from a client.

In the second to fourth embodiments, descriptions were made of cases where a data relay device stores correction information. Hereinafter, a description will be made of a method of sending correction information from a client.

The configuration of this embodiment is the same as the one of the first embodiment shown in FIG. 2. However, on receiving a history information acquisition request, the request analysis unit 51 extracts correction information in addition to the name of data from the data acquisition request. Also, the history management unit 54 has a function to understand correction information sent from a client and correct time in accordance with the correction information. Hereinafter, a description will be made of the fifth embodiment using the reference numerals of the elements in FIG. 2.

First, a description will be made of a case where a client 41a issues a history information acquisition request. It is assumed that the history memory 55 stores the same information as that in the first embodiment. The user sends the following data acquisition request from the client 41a to search for data 62 named "url1" browsed at time "T11".

FIG. 19 shows a data acquisition request containing correction information. The data acquisition request 104 contains a description of "correction-info:" added to the data acquisition request 101 shown in FIG. 12. "correction-info:" indicates correction information. "8/min/add" denotes correction information indicating that eight minutes are added to browsing time.

When the data relay device 50 receives data acquisition request 104, the request analysis unit 51 extracts a data name "url1", time "T11", a search method "backward", and correction information "8/min/add" from the data acquisition request 104.

The history management unit 54 corrects time "T11" by the correction information passed from the request analysis unit 51. In this example, eight minutes are added to "T11"

to generate "T11c". It is assumed that the following relation is satisfied: T11<T12<T13<T11c.

The history management unit 54 performs searching by the generated time "T11c" and the data name "url1". In this example, since information stored in the history memory 55 is the same as that in the first embodiment, the data relay device 50 returns data 62 having contents of "P1" to the client 41a.

In this way, data browsed previously can be searched for by the client specifying correction information.

Next, a sixth embodiment will be described. In the sixth embodiment, time is corrected in a client.

In the above-mentioned fifth embodiment, an example of sending correction information from a client was described. Alternatively, a data acquisition request can also be sent after correcting time at the client. Here, a description will be made of an example that a client stores time required to acquire the entire page, corrects time for rebrowsing by using the time as correction information, and sends a request to acquire history information containing the corrected time to a data relay device.

Figure 20:
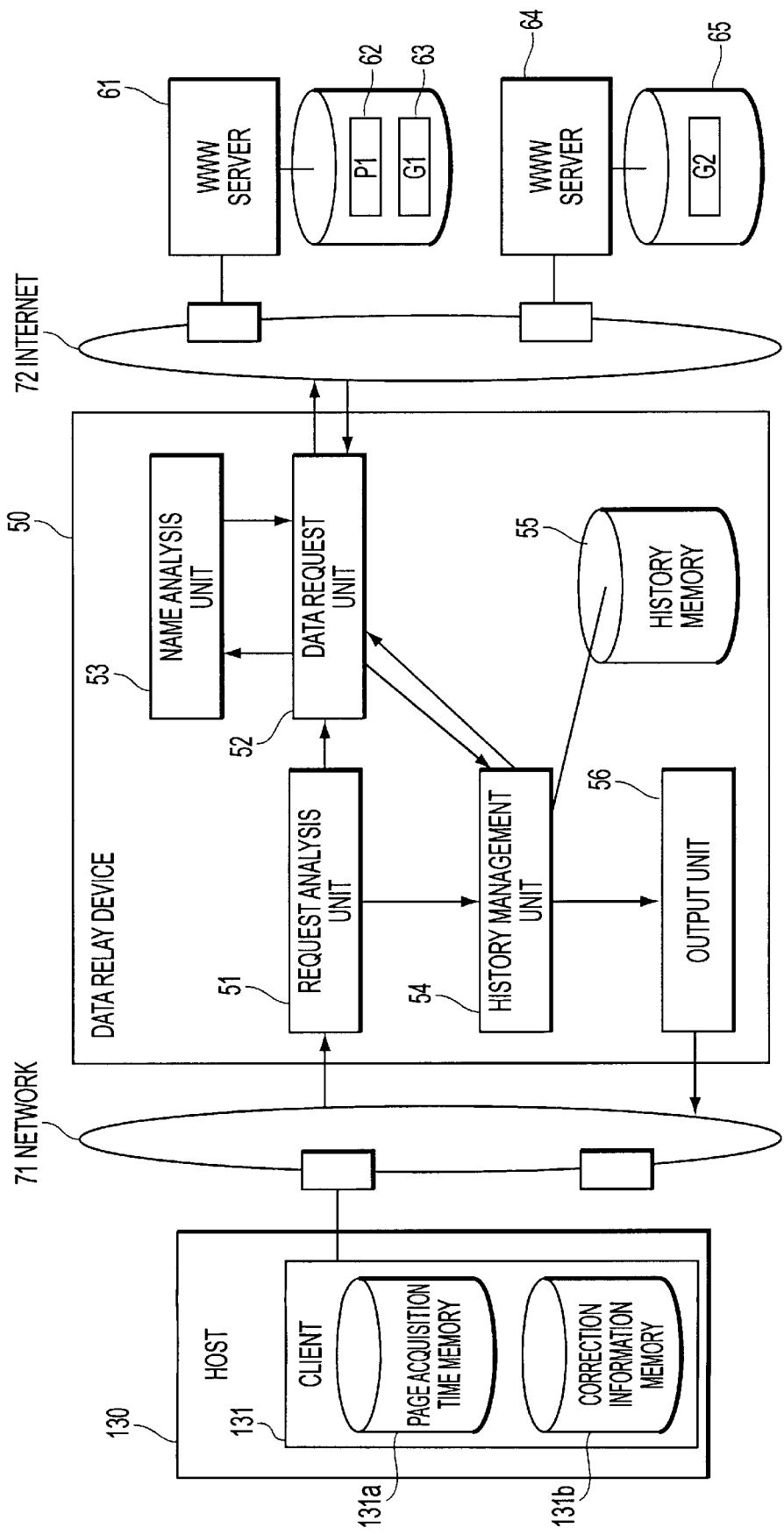
FIG. 20 shows a system configuration of a sixth embodiment of the present invention.

FIG. 20 shows a system configuration of a sixth embodiment of the present invention. In this example, since this embodiment is constructionally the same as the first embodiment except the client 131 within the host 130, identical reference numerals are assigned to the same elements, a description of which will be omitted.

In this embodiment, the client 131 shares the page acquisition time memory 131a and the correction memory 131b.

The page acquisition time memory 131a stores time when the client 131 sent the data acquisition request, and time from transmission of the request to acquisition of the entire page corresponding to the data acquisition request. The time required to acquire the entire page also includes time for acquiring images contained in the page.

The correction memory 131b stores correction information for correcting time for rebrowsing. The correction memory 131b stores correction information indicating that page acquisition time corresponding to requested transmission time is added.

It is assumed that the correction memory 131b presently stores the following data.

Figure 21:
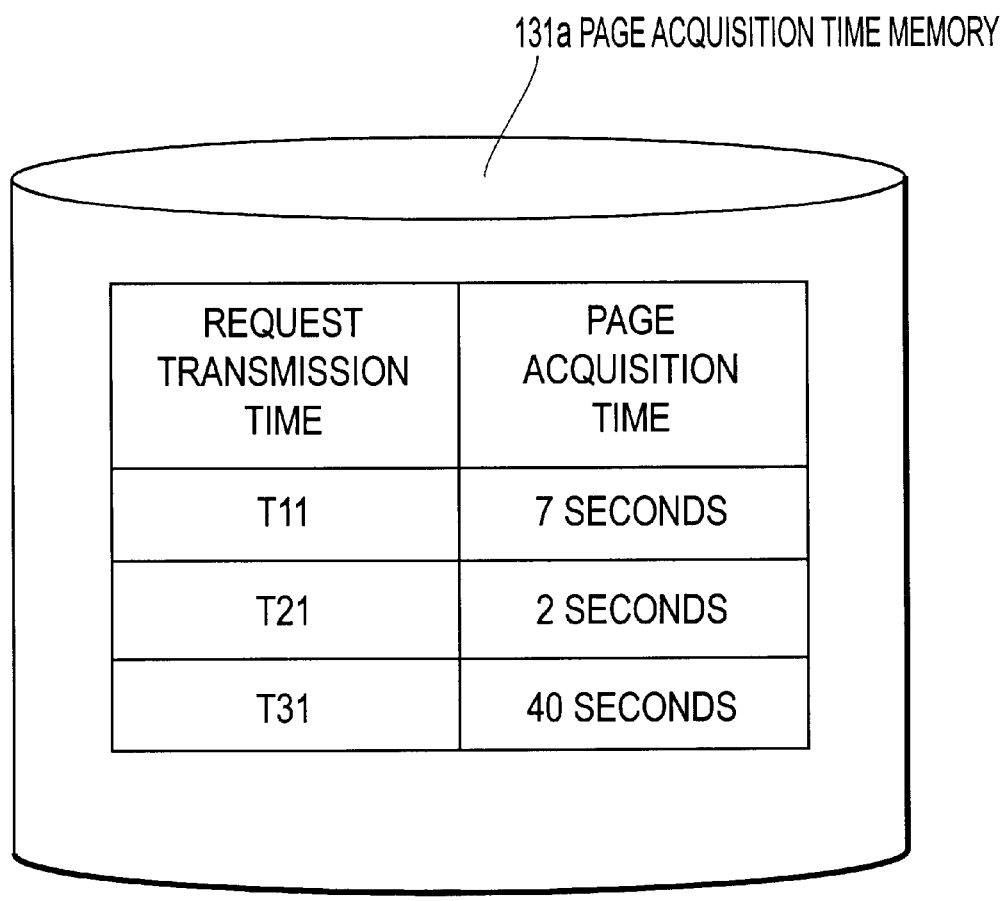
FIG. 21 shows an example of data stored in a page acquisition time memory.

FIG. 21 shows an example of data stored in the page acquisition time memory. In this example, three pieces of page acquisition time are shown: 7, 2, and 40 seconds.

It is assumed that a data acquisition request sent from the client 131 to request the most recent data is the same as the one in the first embodiment. It is seen from FIG. 21 that, when the client 131 sent a request to acquire data of "url1" at time "T11", time required to receive data 62 of HTML document "P1", data 63 of image "G1", and data 65 of image "G2" was seven seconds.

A description will be made of a case where the client 131 issues a history information acquisition request in this state. In this example, it is assumed that the history memory 55 of the data relay device 50 stores the same information as that in the first embodiment (shown in FIG. 6). The client 131 searches the page acquisition time memory 131a to create a data acquisition request for searching for data 62 named "url1" browsed at time "T11".

At this time, since the correction memory 131b stores correction information indicating that page acquisition time corresponding to requested transmission time is added, the time "T11" plus seven seconds is used as corrected time "T11d".

By this process, the client 131 sends the following data acquisition request to the data relay device.

Figure 22:
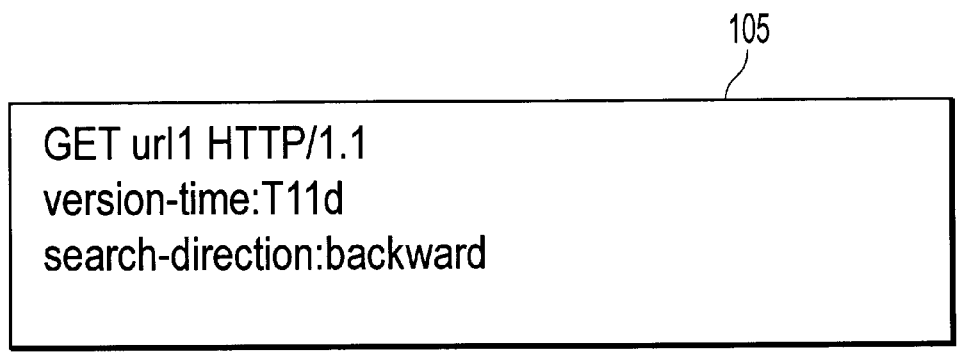
FIG. 22 shows a data acquisition request containing corrected time.

FIG. 22 shows a data acquisition request containing corrected time. The data acquisition request 105 specifies time "T11d" by "version-time:".

When the data relay device 50 receives the data acquisition request 105, the request analysis unit 51 extracts a data name "url1", time "T11d", and a search method "backward" from the data acquisition request 105.

In this example, since "T11d" is time "T11" plus time required to read in all the page corresponding to "url1", the following relation is satisfied: T11<T12<T13<T11d.

The history management unit 54 performs searching by time "T11d" and a data name "url1". Since the history memory 54 stores the same information as that in the first embodiment, the data relay device 50 returns data 62 having contents of "P1" to the client 131.

Similarly, for each of "url2" and "url3" contained in the contents "P1" of data 62, a history information acquisition request is sent using time "T11d" as browsing time. As a result, data 63 of image "G1" and data 65 of image "G2" are acquired.

In this way, by storing time required to acquire the entire page, the client 131 can correct time for rebrowsing by page acquisition time. Since time for rebrowsing is corrected by time required to acquire a page, all images contained in the page can be fetched by searching previous data by the corrected time.

Next, a seventh embodiment will be described. In the seventh embodiment, time to be specified for rebrowsing is returned to a client from a data relay device.

The embodiment having been so far described assumes that a client can specify time when data 62 of "P1" was browsed previously. Here, a description will be made of a case where a client cannot specify time when data of "P1" was browsed previously. Since a system configuration of the seventh embodiment is the same as the one of the first embodiment, the following description will use the reference numerals assigned to the elements in FIG. 2.

In this example, a user first issues a request to relay the following data. Here, a description will be made of the procedure in FIG. 8 and a case where a data relay request with respect to "url1" is sent again at time "T14". At this time, data 62 whose contents are "P1", data 63 whose contents are image "G1", and data 65 whose contents are image G2 are updated to "P1a", "G1a", and "G2a", respectively. The order of browsing time satisfies the following relation: T11<T12<T13<T14<T15<T16.

Figure 23:
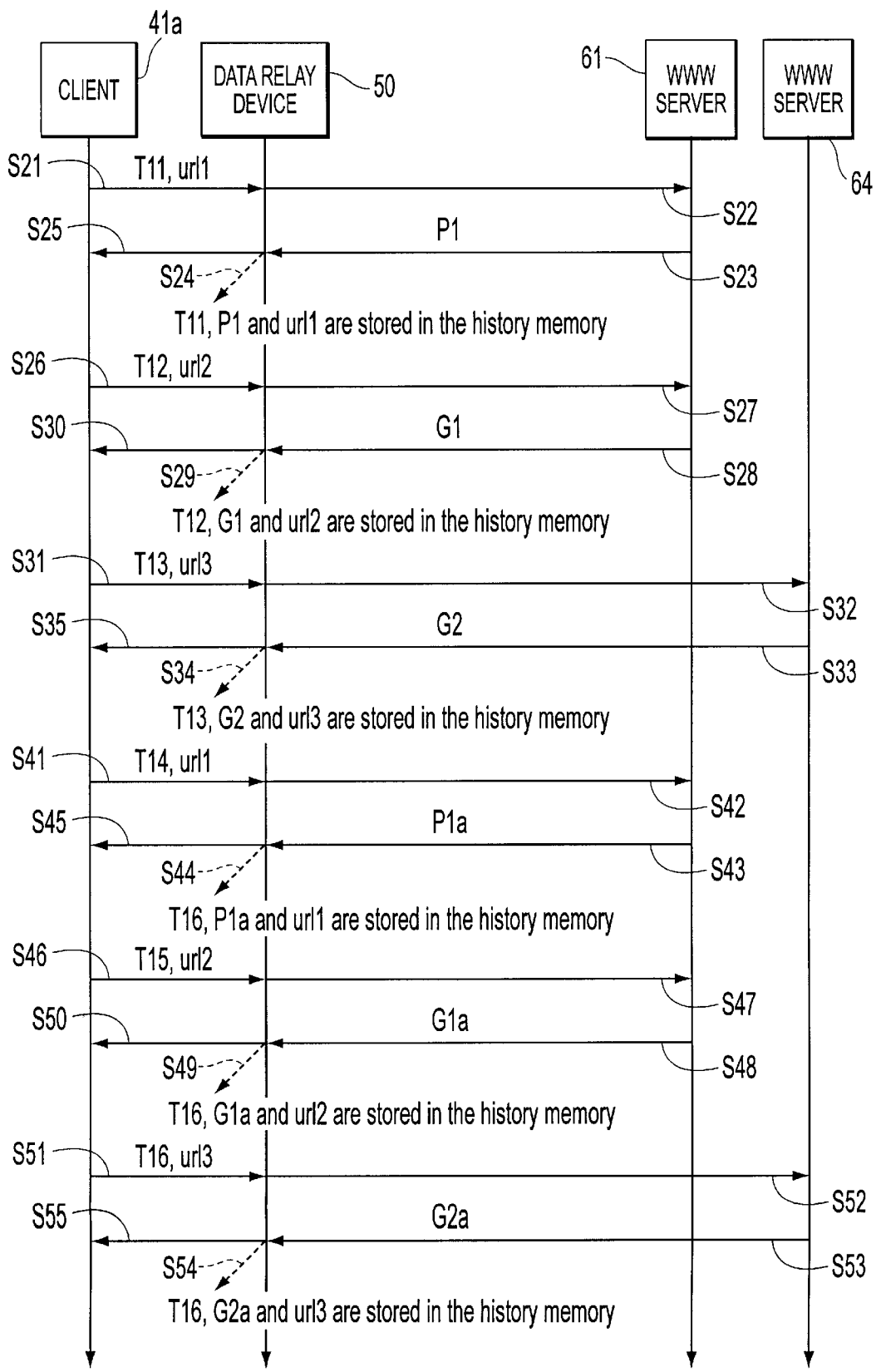
FIG. 23 shows a procedure for acquiring data from a WWW server.

Fig. 23 shows the procedure for acquiring data from WWW servers. In this figure, a description of the steps S21 to S35 is omitted because they are the same as the steps S1 to S15 in FIG. 8, and the step S41 and subsequent steps will be described.

[S41] When the user inputs a data name (URL) to the client 41a, time "T14" and a data name "url1" are sent to the data relay device 50 as a data acquisition request.

[S42] In the data relay device 50, the request analysis unit 51 analyzes the contents of the received data name. When it is determined to be a data relay request, "url1" is passed to the data request unit 52. The data request unit 52 requests data 62 from the WWW server 61.

[S43] The WWW serve 61 returns data 62 whose contents were changed to "P1a", to the data relay device 50.

[S44] In the data relay device 50, the data request unit 52 receives the data 62 sent from the WWW server 61 and passes it the history management unit 54. The history management unit 54 associates the contents "P1a" of the received data 62 with the data name "url1" and time "T14" and stores them in the history memory 55.

[S45] The output unit 56 of the data relay device 50 receives the data 62 from the history management unit 54 and supplies it to the client 41a within the host 41. The contents of the supplied data 62 are displayed on the screen of the client 41a.

[S46] The client 41a analyzes the contents of the data 62 and extracts the names "url2" and "url3" of two pieces of data to be inline-displayed. The client sends time "T15" and the data name "url2" to the data relay device 50 as a data acquisition request.

[S47] In the data relay device 50, the same processing as the step S42 is performed and a request to acquire data 63 is issued to the WWW server 61.

[S48] The WWW server 61 returns the data 63 whose contents were updated to "G1a", to the data relay device 50.

[S49] In the data relay device 50, the data request unit 52 receives the data 63 sent from the WWW server 61 and passes it to the history management unit 54. The history management unit 54 associates the contents "G1a" of the received data 63 with the data name "url2" and time "T15" and stores them in the history memory 55.

[S50] The output unit 56 of the data relay device 50 receives the data 63 from the history management unit 54 and supplies it to the client 41a within the host 41. The contents "G1a" of the supplied data 63 are displayed on the screen of the client 41a.

[S51] To acquire data 65 of the data name "url3" extracted in step S46, the client 41a sends time "T16" and the data name "url3" to the data relay device 50 as a data acquisition request.

[S52] In the data relay device 50, the same processing as the step S42 is performed and a request to acquire data 65 is issued to the WWW server 64.

[S53] The WWW server 64 returns the data 65 whose contents were updated to "G2a", to the data relay device 50.

[S54] In the data relay device 50, the data request unit 52 receives the data 65 sent from the WWW server 64 and passes it to the history management unit 54. The history management unit 54 associates the contents "G2a" of the received data 65 with the data name "url3" and time "T16" and stores them in the history memory 55.

[S55] The output unit 56 of the data relay device 50 receives the data 65 from the history management unit 54 and supplies it to the client 41a within the host 41. The contents "G2a" of the supplied data 65 are displayed on the screen of the client 41a.

If the client 41a does not store time "T11" after the two browsing operations are performed in this way, the system considers a case where the user rebrowse a page ("P1", "G1", and "G2") corresponding to "url1" browsed earlier than time "T31".

At this time, there occur cases where pages cannot be reproduced by the embodiments having been so far described, depending on selection of "T31".

For example, if "T31" satisfying the following relation is selected, the system considers pages reproduced in the first embodiment: T11<T12<T31<T13<T14<T15 <T16. In the first embodiment, the first page is searched for with "backward" and an image contained in the page is searched for with "forward". Accordingly, in this example, as data corresponding to "url1", "url2", and "url3", data containing "P1", "G1a", and "G2a" as contents is returned, respectively, so that pages not browsed previously by the user will be reproduced.

Also, for example, if "T31" satisfying the following relation is selected, the system considers pages reproduced in the second to fourth embodiments: T11<T12<T31<T13 <T14<T15<T16. Since time for rebrowsing is corrected by correction information in the second to fourth embodiments, assume that "T31a" is generated as a result of correcting "T31". At this time, assume that a relation of T11<T12<T31<T13<T14<T31a<T15<T16 is satisfied.

Since searching is performed with "backward" with respect to corrected time in the second to fourth embodiments, as data corresponding to "url1", "url2", and "url3", data containing "P1a", "G1", and "G2" as contents is returned, respectively. Also in this case, pages not browsed previously by the user will be displayed.

The same problem also arises with the fifth and sixth embodiments.

Here, a description will be made of a method for solving such a problem—when a user selects proper time, pages not browsed by the user are displayed.

Here, as one method for solving the above-described problem, a description will be made of an example that the data relay device 50 returns a result for a history information acquisition request to a client along with time when the page was browsed, and the client uses the page browsing time returned from the data relay device 50 when sending a data acquisition request with respect to a data name contained in the returned page.

To rebrowse a page ("P1", "G1", and "G2") corresponding to "url1" browsed earlier than time "T31", the user sends the following history information acquisition request to the data relay device 50 from the client 41a.

Figure 24:
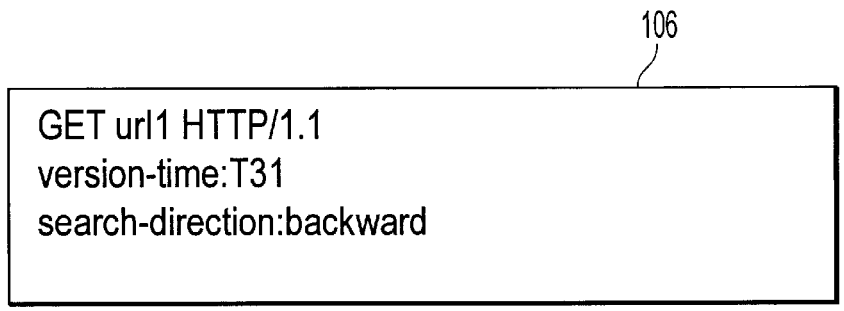
FIG. 24 shows a data acquisition request sent from a client.

FIG. 24 shows a data acquisition request sent by a client. In this data acquisition request 106, time "version time:T31" is specified for rebrowsing and "backward" is specified as a search method. In this example, it is assumed that a relation of T11<T12<T31<T13<T14<T15<T16 is satisfied.

When the data relay device receives a data acquisition request 106, the history management unit 54 searches for data browsed earlier than time "T31" with respect to the data name "url1". In this example, since "backward" is specified as a search method, the history management unit 54 detects data whose contents are "P1", and the output unit 56 returns the data to the client 41a. At this time, the output unit 56 returns to the client 41a the time "T11" indicating time when the user browsed "P1" previously. Specifically, when the "P1" data is returned, the following lines are included in HTTP header information.

Figure 25:
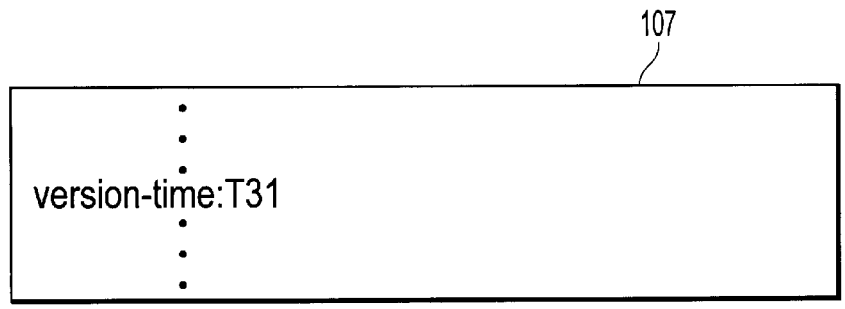
FIG. 25 shows the contents of a description to be included in header information.

FIG. 25 shows a description included in header information. As shown in the figure, a description "version-time:T31" is added to the header information 107. "version-time:" indicates time when the user browsed "P1" previously.

When receiving the "P1" data from the data relay device 50, the client 41a determines from the header information that time when "P1" was browsed previously is "T11".

Next, the client 41a sends a request to acquire history information of "url2", which is an image name contained in "P1". At this time, "T11" is specified as browsing time and "forward" is specified as a search method. As a result, an image "G1" is returned from the data relay device 50 as data corresponding to "url2".

Similarly, the client 41a sends a request to acquire history information of "url3", which is an image name contained in "P1". At this time, "T11" is specified as browsing time and "forward" is specified as a search method. As a result, an image "G3" is returned from the data relay device 50 as data corresponding to "url3".

In this way, users can reproduce pages browsed previously without specifying exact time of previous browsing.

In this example, a page browsed earlier than user-specified time was searched for. However, a page browsed later than user-specified time can also be searched for. In this case, when a history information acquisition request is first sent, a request described below is sent.

Figure 26:
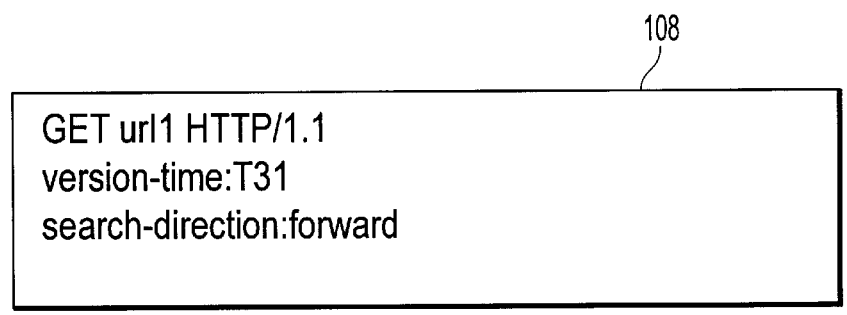
FIG. 26 shows a data acquisition request sent from a client.

FIG. 26 shows a data acquisition request sent by a client. In the data acquisition request 108, "forward" is specified in "search-direction:". Accordingly, data browsed later than user-specified time "T31" is searched for. Images contained in the data are searched for according to the same procedure as described above.

Although a description was made of an example that information about time when data was browsed previously by a user is sent to the client 41a from the data relay device 50 in a manner that contains the time in HTTP header information, the time may also be included in the data. For example, when data is returned from the data relay device 50 to the client 41a, time when the user browsed data 62 of "P1" shown in FIG. 5 may be added to <IMG> tag 62a contained in the data 62. This addition causes portion of <IMG> tag 62a to be converted as described below.

Figure 27:
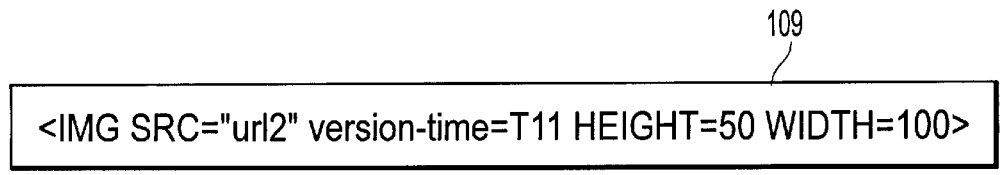
FIG. 27 shows an image tag to which time is added.

FIG. 27 shows an image tag to which time is added. After conversion, a description "version-time=T11" is added to <IMG> tag 109.

When requesting image "G2" corresponding to "url2" from the data relay device 50, the client 41a references a value of "version-time" in the tag 109 and sends a history information acquisition request.

In this way, based on time when the first page browsed previously was browsed, images contained in the page can be requested.

Next, the eighth embodiment will be described. In the eighth embodiment, browsing completion time is sent to the data relay device.

Here, a description will be made of an example that, by a client sending to a data relay device the time when page browsing is completed, the data relay device stores the name of the page and the data of the page associatively with browsing end time sent from the client.

Figure 28:
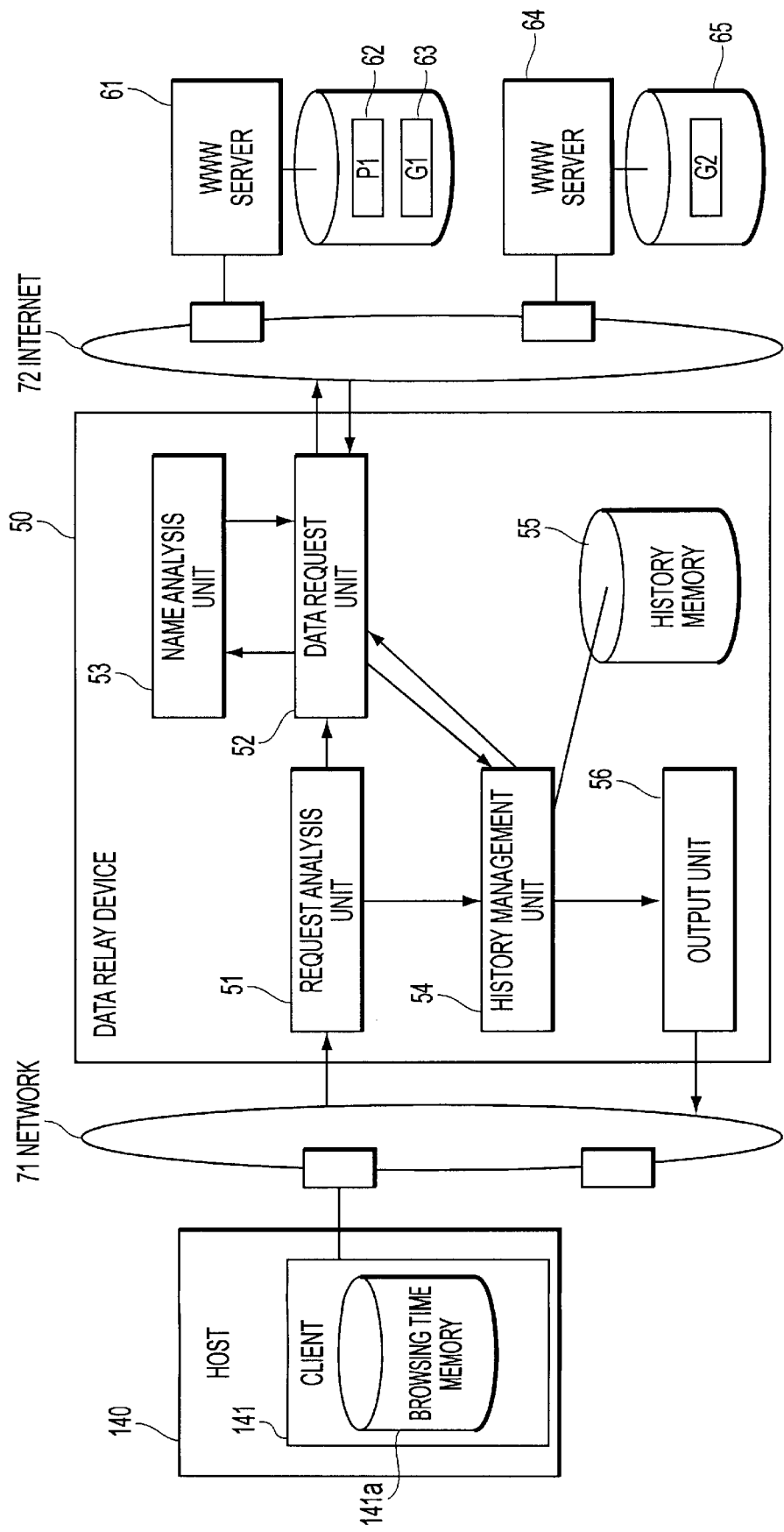
FIG. 28 shows a system configuration of an eighth embodiment of the present invention.

FIG. 28 shows a system configuration of the eighth embodiment. In this example, since this embodiment is constructionally the same as the first embodiment except the client 141 within the host 140, identical reference numerals are assigned to the same elements, a description of which will be omitted.

In this embodiment, the client 141 newly has a browsing time memory 141a to store browsing time.

The client 141 first sends a request to relay data 62 on "url1" to the data relay device 50. At this time, the client 141 includes in the request the time when the client 141 sent the data acquisition request and the name of host 140 in which the client 141 operates. The data acquisition request is as described below.

Figures 29, 30, 31:
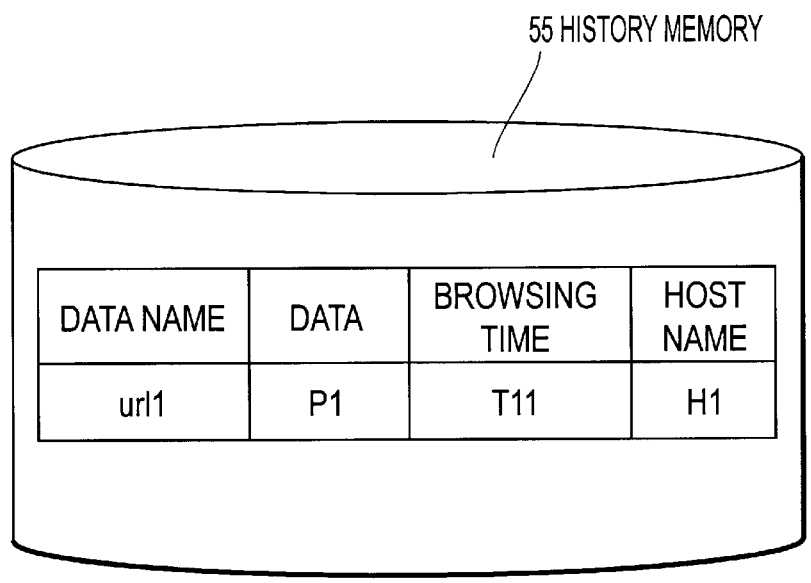
FIG. 29 shows a data acquisition request containing a host name.
FIG. 30 shows history information stored in a history memory.
FIG. 31 shows a data acquisition request for acquiring image data.

FIG. 29 shows a data acquisition request containing a host name. In the data acquisition request 151, "request-time:" denotes time when the client 141a sent a data acquisition request. "host-name" indicates the name of a host in which the client 141 operates.

This example assumes that one host can send only one data acquisition request.

When sending the data acquisition request 151, the client 141 stores time "T11" in the browsing time memory 141a.

When the data relay device 50 receives the data acquisition request 151, the request analysis unit 51 extracts a data name "url1", time "T11", and host name "H1" from the data acquisition request 151.

The data relay device 50 returns data 62 corresponding to the data name "url1" to the client 141. At this time, the data relay device 50 associates the data name "url1", the contents "P1" of the data, time "T11", and host name "H1" and stores them in the history memory 55. At this time, the history memory 55 will have the following contents.

FIG. 30 shows history information stored in the history memory. As shown in the figure, in this embodiment, a host name is included in the history information.

Next, the client 141 analyzes the contents "P1" of data 62 and extracts the name of image data contained therein. It sends a data acquisition request with respect to the name "url2" of image data contained in the data 62. The data acquisition request is as described below.

FIG. 31 shows a data acquisition request for acquiring image data. The data acquisition request 152 has "url2" as the name of data to be acquired and "T12" as time by "request-time:".

In response to the data acquisition request 152, the data relay device 50 returns data 63 of image "G1" corresponding to "url2".

Similarly, the client 141 sends a data acquisition request with respect to "url3" and the data relay device 50 returns data 65 of image "G2" corresponding to "url3". At a this time, the history memory 55 will have the following contents.

Figure 32:
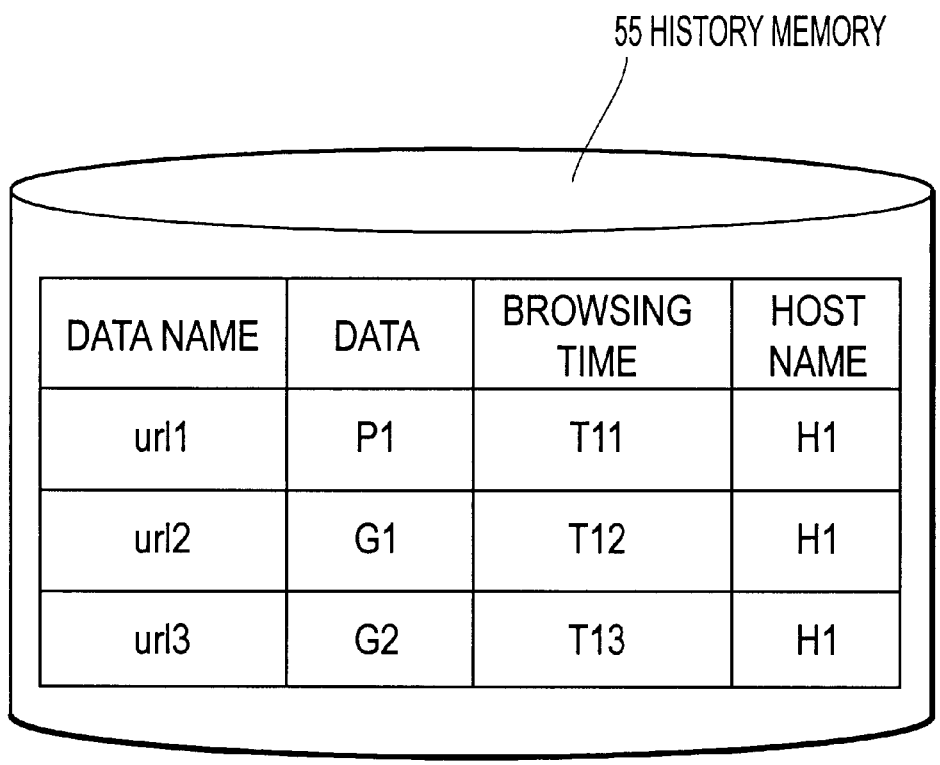
FIG. 32 shows history information stored in a history memory after all data of one page has been relayed.

FIG. 32 shows history information stored in the history memory after all data of one page has been relayed. As shown in the figure, the history memory 55 stores history information with host names appended, corresponding to "url1", "url2", and "url3".

On receiving each piece of data, the client 141 displays a page ("P1", "G1", and "G2") corresponding to "url1" on the screen. After ending the receipt of "P1", "G1", and "G2", the client 141 sends time "T41" indicating the receipt end time to the data relay device 50. At this time, the client 141 fetches time "T11" stored in the browsing time memory 141a and includes it in the data acquisition request.

Specifically, the following header information is sent by HTTP.

Figure 33:
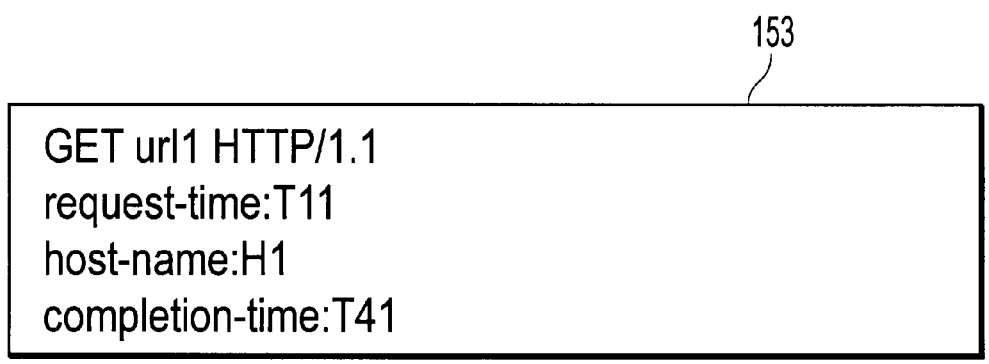
FIG. 33 shows a data acquisition request containing browsing end time.

FIG. 33 shows a data acquisition request containing browsing end time. The data acquisition request 153 aims at, not acquiring data, but setting time indicating browsing end time in the history memory 55. In the data acquisition request 153, "completion-time:" indicates time when the client 141 terminated displaying a page ("P1", "G1", and "G2") corresponding to "url1". The history management unit 54 of the data relay device 50 that received the header information searches for history information corresponding to a set of the data name "url1", time "T11", and host name "H1" and changes browsing time in the history information to time "T41". At this time, the history memory 55 will have the following contents.

Figure 34:
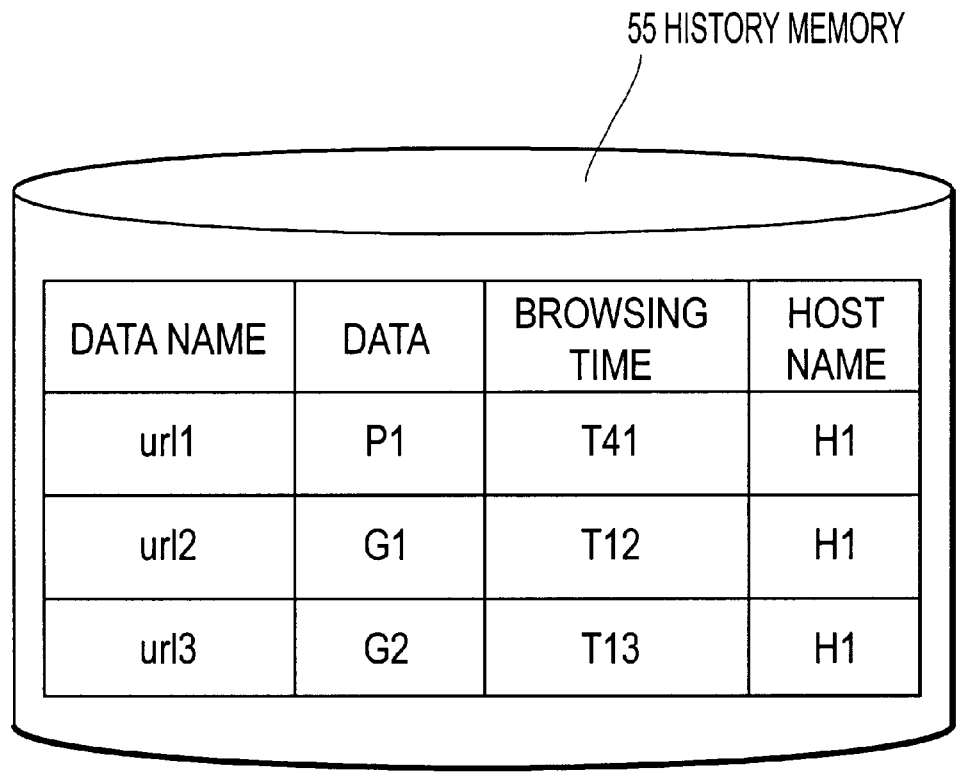
FIG. 34 shows history information stored in a history memory after browsing end time has been reflected.

FIG. 34 shows history information stored in the history memory in which browsing end time has been reflected. In this way, time "T41" is set as browsing time of "url1". The order of browsing time satisfies the following relation: T12<T13<T41.

Accordingly, when sending a request to acquire history information of "url1", the client 141 specifies time "T41"

and "backward" as a search method. When sending a request to acquire history information contained in a page, the client 141 also specifies time "T41" and "backward" as a search method. This enables pages browsed previously to be reproduced.

Next, a description will be made of a ninth embodiment. In the ninth embodiment, when a request is sent to acquire data of an image contained in a page, the browsing time of a main page in which the page is contained is included in the data acquisition request, whereby the history memory stores the structure of the page.

Since a system configuration of this embodiment is the same as the one of the eighth embodiment, the following description will use the reference numerals assigned to the elements in FIG. 28 to describe the ninth embodiment.

The client 141 first sends a request to relay data on the data name "url1" to the data relay device 50. At this time, in the request are included the time when the client 141 sends the data acquisition request and the name of a host in which the client 141 operates. The data acquisition request is the same as shown in FIG. 29.

In the data acquisition request, "request-time:" denotes time when the client 141 sent the data acquisition request. "host-name" indicates the name of a host in which the client 141 operates. In this embodiment, it is assumed that one host can send only one data acquisition request at a time.

When sending this request, the client 141 stores time "T11" in the browsing time memory 141a.

When the data relay device 50 receives the data acquisition request, the request analysis unit 51 extracts the data name "url1", time "T11", and host name "H1" from the data acquisition request.

The data relay device 50 requests data 62 corresponding to "url1" from the WWW server 61. The WWW server 61 returns to the data relay device 50 the data 62 whose contents are "P1", as data corresponding to "url1".

The data relay device 50 returns data 62 corresponding to "url1" to the client 141. At this time, the data relay device 50 associates the data name "url1", the contents "P1" of the data, time "T11", and host name "H1" and stores them in the history memory 55. Information stored in the history memory 55 at this time is the same as shown in FIG. 30.

Next, the client 141 analyzes the contents "P1" of data 62 and extracts the name of image data contained therein. It sends a data acquisition request with respect to the name "url2" of image data contained in "P1". At this time, the client 141 fetches time "T11" stored in the browsing time memory and includes it in the request. The data acquisition request is as described below.

Figure 35:
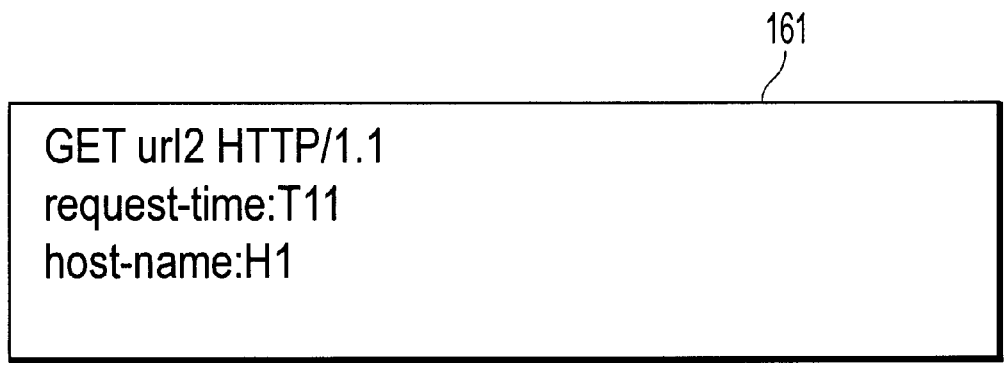
FIG. 35 shows a data acquisition request specifying time stored in a browsing time memory.

FIG. 35 shows a data acquisition request specifying time stored in the browsing time memory. In the data acquisition request 161, as time indicated by "request-time:", time "T11" when a request to acquire "url1" data was sent is sent instead of time "T12" when a request to acquire "url2" data was sent.

The data relay device 50 requests data 63 corresponding to "url2" from the WWW server 61. The WWW server 61, as data 63 corresponding to "url2", returns image data "G1" to the data relay device 50.

The data relay device 50 returns data 63 of image "G1" corresponding to "url2" to the client 141.

Similarly, the client 141 sends a data acquisition request by specifying "T11" as time with respect to "url3", and the data relay device 50 returns data 65 of image "G2" corresponding to "url3". At this time, the history memory 55 will have the following contents.

Figure 36:
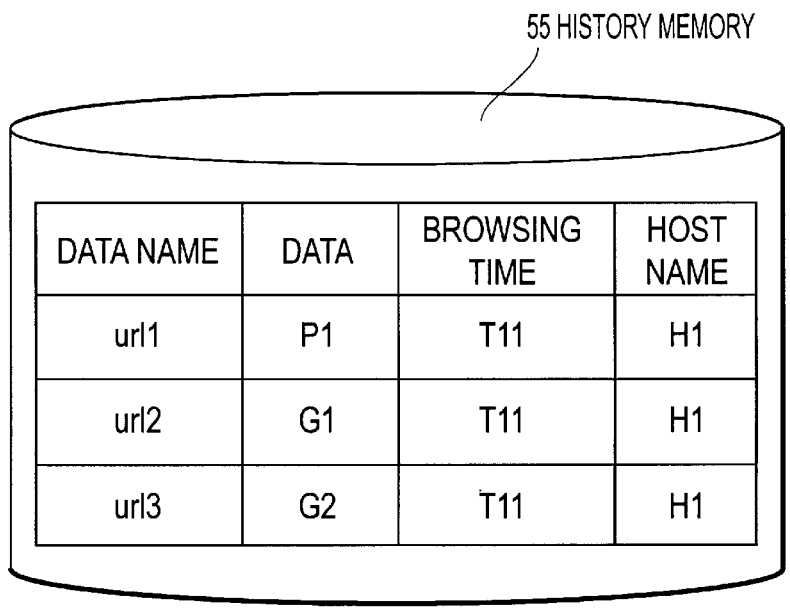
FIG. 36 shows history information stored in a history memory.

FIG. 36 shows history information stored in the history memory. As shown in the figure, browsing time of history information of "url1", "url2", and "url3" is all set to time "T11".

The client 141 displays a page ("P1", "G1", and "G2") corresponding to "url1" on the screen.

Next, as is the case described in FIG. 23, it is assumed that the client 141 browses "url1" again at time "T14" after the contents of data 62 were changed to "P1a", the contents of data 63 to "G1a", and the contents of data 65 to "G2a". At this time, the history memory 55 will have the following contents.

Figure 37:
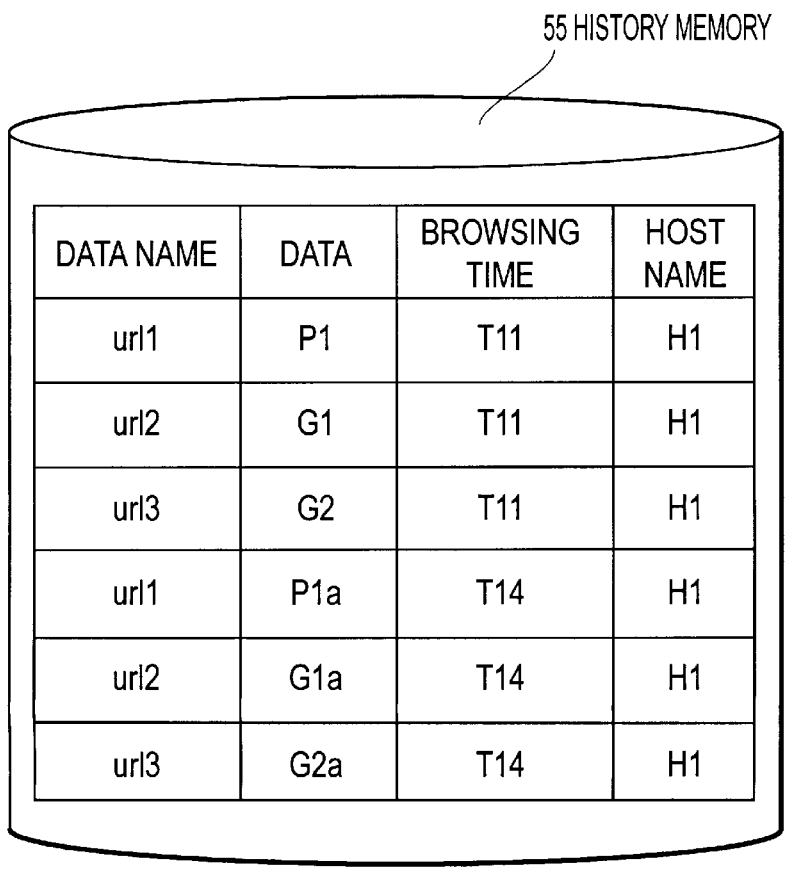
FIG. 37 shows history information stored in a history memory.

FIG. 37 shows history information stored in the history memory. As shown in the figure, history information corresponding to "url1", "url2", and "url3" in which time "T14" is set as browsing time is set.

Next, a description will be made of a case where the client 141 issues a history information acquisition request.

To rebrowse a page corresponding to "url1" browsed earlier than time "T31", a user sends the following history information acquisition request to the data relay device 50.

Figure 38:
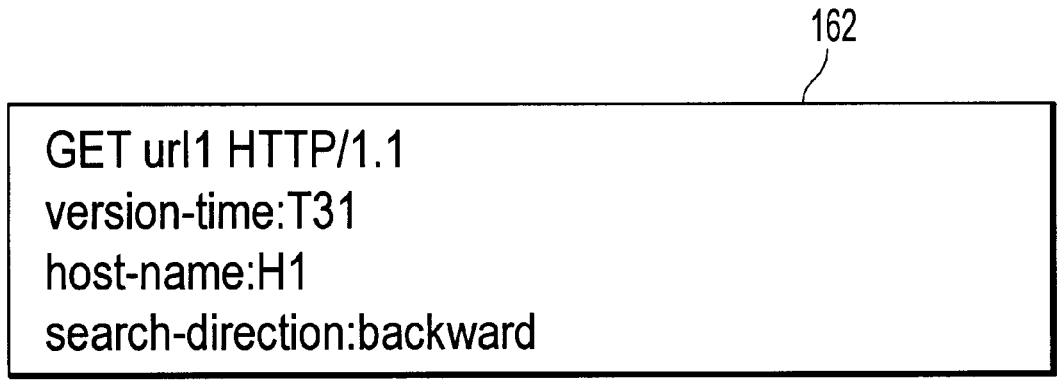
FIG. 38 shows a data acquisition request intended to acquire history information.

FIG. 38 shows a data acquisition request intended to acquire history information. This data acquisition request 162 specifies time "T31" as "version-time:". It is assumed that a relation of T11<T12<T31<T13<T14<T15<T16 is satisfied.

At this time, the client stores time "T31" in the browsing time memory 141a.

When the data relay device 50 receives the data acquisition request 162, the history management unit 54, with respect to "url1", searches data browsed earlier than time "T31" for data associated with a host name of "H1". Since "backward" is specified as a search method, the history management unit 54 determines that data whose contents are "P1" is output data, and the output unit 56 returns the data to the client 141.

Next, the client 141 sends a request to acquire history information of "url2", which is the name of an image contained in "P1". At this time, the client 141 fetches time "T31" from the browsing time memory 141a and includes it in the history information acquisition request as "version-time:". The data acquisition request sent at this time is as shown below.

Figure 39:
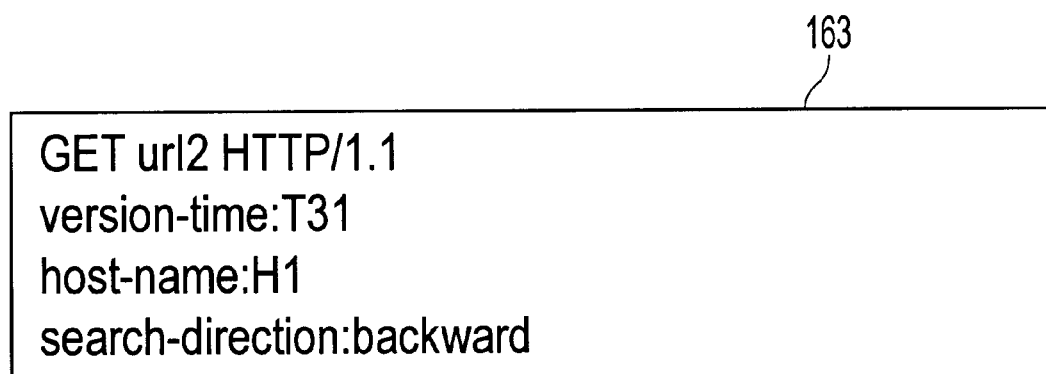
FIG. 39 shows a data acquisition request for acquiring an image.

FIG. 39 shows a data acquisition request for acquiring an image. The data acquisition request 163 has the same contents as the data acquisition request in FIG. 38, except that the name of data to be acquired is "url2".

When the data relay device 50 receives the data acquisition request 163, the history management unit 54, with respect to "url2", searches data browsed earlier than time "T31" for data associated with a host name of "H1" by a search method of "backward". As a result, as data corresponding to "url2", data whose contents are "G2" is returned.

Similarly, the client 141 sends a request to acquire history information of "url3", which is the name of an image contained in "P1". As a result, data whose contents are "G2" is returned from the data relay device 50 as data corresponding to "url3".

In this way, users can reproduce pages browsed previously without specifying exact time of previous browsing.

In this example, as shown in FIG. 37, although a description is made of a case where data of a page corresponding to "url1" has all been updated, rebrowsing can be performed according to the same procedure also when not all of them has been updated. Further, in this example, although a description is made of a method of storing data in the history memory for all pages having been browsed, it is also possible to store only a pointer to data already stored, for pages having not been updated. For example, the second time that "url1" is browsed, assume that an image "G1" corresponding to "url2" has not been updated. At this time, the history memory 55 will have the following contents.

Figure 40:
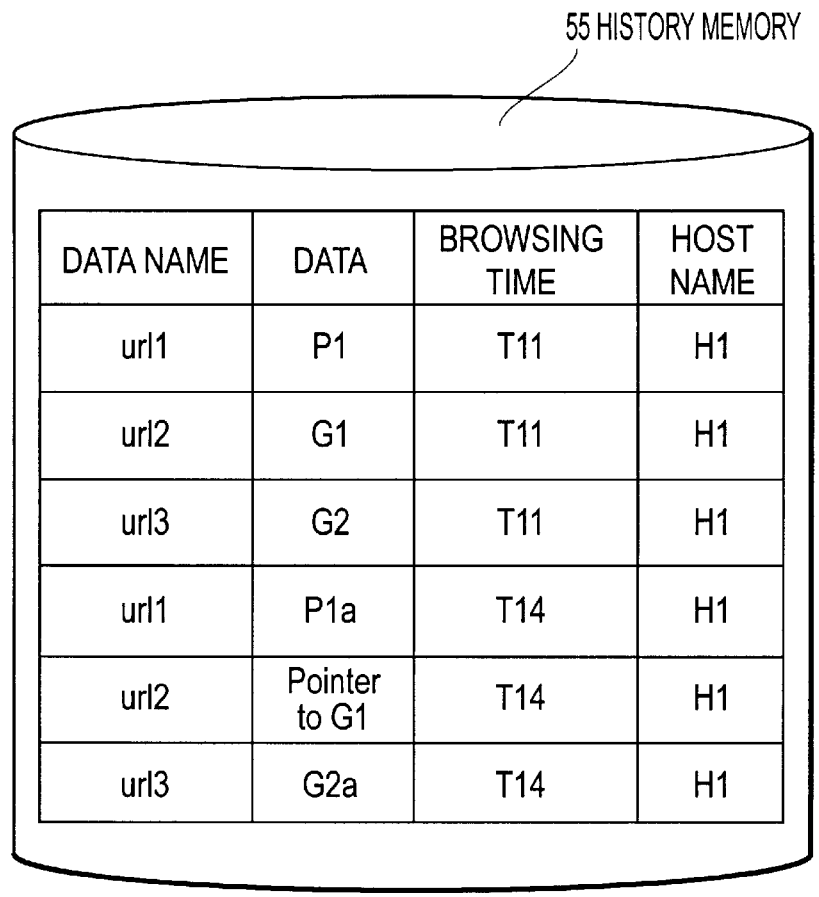
FIG. 40 shows the contents of the history management unit in which data already stored is specified using pointers.

FIG. 40 shows the contents of the history management unit in which data already stored is specified using pointers. In this example, since an image "G1" corresponding to the data name "url2" is not updated, a pointer to "G1" browsed at time "T12" is stored in the data field of the image "G1" browsed at time "T15". This enables the capacity of history information to be minimized.

Next, a description will be made of a tenth embodiment. In the tenth embodiment, history information can be specified by version.

In the above-mentioned embodiments, a data acquisition request, which is constituted of a data name, information about time when the data was browsed previously, and a search method, is sent. In this embodiment, a description will be made of an example of searching for data of any version by including the version of the data in the request instead of time when the data was browsed previously.

Since a system configuration of this embodiment is the same as the one of the eighth embodiment, the following description will use the reference numerals assigned to the elements in FIG. 28 to describe the tenth embodiment.

It is assumed that the history memory 55 has the contents shown in FIG. 37. A description will be made of a case where the client 141 issues a history information acquisition request.

A user sends the following history information acquisition request to the data relay device 50 to rebrowse a page corresponding to "url1" browsed earlier than time "T31".

Figure 41:
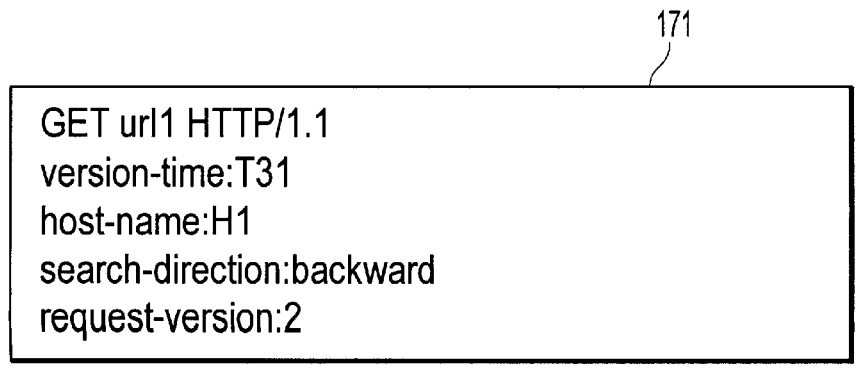
FIG. 41 shows a data acquisition request specifying the version of history information.

FIG. 41 shows a data acquisition request specifying the version of history information. "request-version:" of the data acquisition request denotes the version of data to be rebrowsed. In this example, the version of data browsed earlier than specified time and closest to the specified time is represented by the digit "1" and a version browsed earlier is represented by the digit "2". In this request, a version immediately preceding a version browsed at time closest to time "T31", of pages browsed earlier than time "T31" is specified. It is assumed that a relation of T11<T12<T13<T14<T15<T16<T31 is satisfied.

The client 141 stores time "T31" in the browsing time memory 141a.

On receiving the data acquisition request 171, the data relay device 50, with respect to "url1", searches data browsed earlier than time "T31" for data associated with a host name of "H1". In this example, data whose contents are "P1a", browsed at "T14", is pertinent data. The history management unit 54 decreases the version number by one. Since the version number is not 0, the history management unit 54, with respect to "url1", searches data browsed earlier than time "T14" for data associated with a host name of "H1". In this example, data whose contents are "P1", browsed at "T11", is pertinent data. The history management unit 54 decreases the version number by one. Since the version number is 0, the data relay device 50 returns data of "P1" as an answer to the history information acquisition request to the client 141.

Next, the client 141 sends a request to acquire history information of "url2", which is the name of an image contained in data of "P1". The client 141 fetches time "T31" from the browsing time memory 141a and includes it in the history information acquisition request. At this time, the client 141 sends the following history information acquisition request.

FIG. 42 shows a data acquisition request sent from a client to acquire an image. The data acquisition request 172 is the same as the one in FIG. 41 except that the name of data to be acquired is "url2".

When the data relay device 50 receives the data acquisition request 172, the history management unit 54, with respect to "url2", searches data browsed earlier than time "T31" for data associated with a host name of "H1". In this example, data whose contents are "P1a", browsed at "T14", is pertinent data. The history management unit 54 decreases the version number by one. Since the version number is not 0, the history management unit 54, with respect to "url2", searches data browsed earlier than time "T14" for data associated with a host name of "H1". In this example, data whose contents are "G1", browsed at "T11", is pertinent data. The history management unit 54 decreases the version number by one. Since the version number is 0, the data relay device 50 returns data of "G1" as an answer to the history information acquisition request to the client 141.

Similarly, the client 141 sends a request to acquire history information of "url3", which is the name of an image contained in "P1". As a result, data whose contents are "G2" is returned from the data relay device 50 as data corresponding to "url3".

In this way, the user can reproduce pages browsed previously by specifying previous browsing time and the version number of data.

The processing function described above can be implemented by a computer. In this case, the processing contents of functions that a data relay device, hosts, and WWW servers should have are described by programs stored in computer-readable recording media, and by executing the programs on the computer, the above-described processing is implemented on the computer. Computer-readable recording media include magnetic recording devices, semiconductor memory, and the like. The programs can be put on the market in a format that stores them in portable recording media such as CD-ROM (Compact Disk Read Only Memory) and floppy disk, or can be transferred to other computers via a network by storing them in memories of computers connected through the network. To execute the programs by a computer, store them in hard disk or the like within the computer and load them into a main memory.

As described above, since a data relay device according to the present invention, on receiving a history information search request, searches for history information in accordance with a search method contained in a data acquisition request, when a data acquisition request is outputted from a data use unit to acquire history information, access to appropriate history information can be made by specifying a proper search method even though exact time is unknown. As a result, when an access is made from the data use unit to history information of information consisting of a plurality of pieces of data which are accessed in a somewhat fixed order, such as document data and image data contained in the document data, information consisting of a plurality of pieces of data can be rebrowsed in the same state that it was browsed previously, by specifying time at access to basic document data and a proper search method.

Since information terminal equipment according to the present invention outputs a data acquisition request including a search method when gaining access to data of history information stored in a data relay device, a history information acquisition request specifying a search method can be outputted to the above-mentioned data relay device according to the present invention. Accordingly, by specifying a proper search method, information consisting of a plurality of pieces of data can be rebrowsed in the same state that it was browsed previously.

Since computer-readable recording media storing a data relay program according to the present invention enable a computer to search for history information in accordance with a search method included in a data acquisition request, in order that information consisting of a plurality of pieces of data is rebrowsed in the same state that it was browsed previously, a series of data can be offered using the computer.

Further, since computer-readable recording media storing an information browsing program according to the present invention enable a computer to output a data acquisition request including a search method when an access is made to data of history information stored in a data relay device, the computer can be used to output a history information acquisition request specifying a search method for a data relay device according to the present invention.

What is claimed is:

1. A data relay device relaying data between a data use unit that uses data, and a data supply unit that supplies stored data, said data relay device comprising:

a history memory that stores history information of relayed data;

a request analysis unit that receives a data acquisition request from said data use unit, analyzes whether said data acquisition request is a data relay request or a history information acquisition request, and extracts a data name from said data acquisition request when said data acquisition request is a data relay request, while extracting a data name, time, and a search method from said data acquisition request when said data acquisition request is a history information acquisition request;

a data request unit that, when said data acquisition request is a data relay request, requests data corresponding to the data name extracted by said request analysis unit from the data supply unit and receives data sent from the data supply unit in response to the request; and a history management unit that, when said data acquisition request is a data relay request, associatively stores the data received by said data request unit, the name of the data, and time when data relay processing was performed, in said history memory as history information, and outputs the data received by said data request unit, while, when the data acquisition request is a history information acquisition request, using the data name and time extracted by said request analysis unit to search said history memory for appropriate history information by the search method extracted by said request analysis unit and outputting data contained in the detected history information.

2. The data relay device according to claim 1, wherein, when said data acquisition request is a history information acquisition request, said history management unit, if forward search is specified as a search method extracted by said request analysis unit, searches history information having a data name extracted by said request analysis unit for history information having the same time as extracted by said request analysis unit, and when no appropriate history information is found, searches for history information having the most recent time after one extracted by said request analysis unit.

3. The data relay device according to claim 1, wherein, when said data acquisition request is a history information acquisition request, said history management unit, if backward search is specified as a search method extracted by said request analysis unit, searches history information having a data name extracted by said request analysis unit for history information having the same time as extracted by said request analysis unit, and when no appropriate history information is found, searches for history information having the most recent time before one extracted by said request analysis unit.

4. The data relay device according to claim 1, further comprising a correction memory that stores correction information indicating processing for correcting time extracted by said request analysis unit, wherein said history management unit, when said data acquisition request is a history information acquisition request, corrects time extracted by said request analysis unit in accordance with correction information stored in said correction memory, and searches for history information by the corrected time.

5. The data relay device according to claim 4, further comprising:

a relay failure time memory that, when a data request from said data request unit to the data supply unit results in unsuccessful data reception, cumulatively stores relay failure time from the data request to recognition of relay failure for each failure of relay, wherein said correction memory stores correction information for correcting time by using relay failure time stored in said relay failure time memory.

6. The data relay device according to claim 5, wherein said correction memory stores correction information specifying that time is to be corrected using the longest of relay failure time stored in said relay failure time memory.

7. The data relay device according to claim 5, wherein said correction memory stores correction information specifying that correction is to be performed using the average of relay failure time stored in said relay failure time memory.

8. A data relay device according to claim 5, wherein said correction memory stores correction information specifying that correction is to be performed using relay failure time corresponding to data request time closest to time analyzed by the request analysis unit, of relay failure time stored in said relay failure time memory.

9. The data relay device according to claim 4, further comprising:

a data acquisition time memory that stores data acquisition time required from the issuance of a data request from said data request unit to the data supply unit to reception of data sent from the data supply unit in response to the request, said time being added for each request of data, wherein said correction memory stores correction information specifying that time is to be corrected using a value obtained from data acquisition time stored in said data acquisition time memory.

10. The data relay device according to claim 1, wherein said request analysis unit, when said data acquisition request is a history information acquisition request, extracts a data name, time, a search method, and correction information indicating processing for correcting time from said data acquisition request, and said history management unit, when said data acquisition request is a history information acquisition request, corrects time extracted by said request analysis unit by correction information extracted by said request analysis unit, and searches for history information in accordance with the corrected time.

11. The data relay device according to claim 1, wherein said output unit, when said data acquisition request is a history information acquisition request, outputs time contained in history information detected by said history management unit along with output data to the data use unit.

12. The data relay device according to claim 11, wherein said output unit adds time contained in history information detected by said history management unit to the contents of output data.

13. The data relay device according to claim 1, wherein said request analysis unit extracts a data name, time, and reception completion time from said data acquisition request when the time of reception completion of data requested by the data use unit is contained in said data acquisition request, and said history management unit stores the reception completion time extracted by said request analysis unit in said history memory associatively with a data name and data contents contained in said data acquisition request.

14. The data relay device according to claim 1, wherein said request analysis unit extracts a data name, time, and a failure-time processing method from said data acquisition request when a failure-time processing method at failure in a search for history information is contained in said data acquisition request, and said history management unit performs processing in accordance with a failure-time processing method extracted by said request analysis unit when a search for history information fails.

15. The data relay device according to claim 1, wherein said history management unit commands said data request unit to acquire current data corresponding to a data name contained in a data acquisition request when a search fails.

16. The data relay device according to claim 1, wherein, when an attempt is made to store history information in said history memory when data having the same contents as those of data to be stored already exists in another history information, said history management unit associatively stores a data name, time, and a pointer to the data having the same contents as those of the data to be stored in said history memory.

17. Information terminal equipment that relays data to and from a server and accesses data on the server connected through a network via a data relay device, which associatively manages relayed data, a data name, and time as management information and sends back data contained in appropriate history information in response to a data acquisition request containing a data name, time, and a search method, said information terminal equipment comprising:

a request unit that outputs a data acquisition request specifying a data name to said data relay device when accessing the most recent data on the server, and outputs a data acquisition request specifying a data name, time, and a search method when accessing data in history information stored in said data relay device;

a data acceptance unit that receives data sent from said data relay device in response to said data acquisition request; and a display device that displays data received by said data acceptance unit on the screen of a display device.

18. The information terminal equipment according to claim 17, wherein, when receiving data corresponding to said data acquisition request from said data relay device, if another data name is contained in the received data, said request unit creates a new data acquisition request from the data name contained in the received data and time contained in said data acquisition request and outputs it to said data relay device.

19. The information terminal equipment according to claim 17, wherein, when sending a data acquisition request in order to access history information and receiving data corresponding to the sent data acquisition request, if another data name is contained in the received data, said request unit creates a new data acquisition request containing the data name contained in the received data, time contained in said data acquisition request, and the search method of searching for data browsed later than the contained time, and outputs it to said data relay device.

20. The information terminal equipment according to claim 17, wherein, when sending a data acquisition request in order to access history information and receiving data corresponding to the sent data acquisition request, if another data name is contained in the received data, said request unit creates a new data acquisition request containing the data name contained in the received data, time contained in said data acquisition request, and the search method of searching for data browsed earlier than the contained time plus predetermined correction time, and outputs it to said data relay device.

21. A computer-readable recording medium storing a data relay program for relaying data between a data use unit that uses data obtained by request and a data supply unit that supplies stored data in response to a request, a computer being instructed to execute said data relay program comprising:

a history memory that stores history information of relayed data;

a request analysis unit that, on receiving a data acquisition request from the data use unit, analyzes whether said data acquisition request is a data relay request or history information acquisition request, and extracts a data name from said data acquisition request when said data acquisition request is a data relay request, while extracting a data name, time, and a search method from said data acquisition request when said data acquisition request is a history information acquisition request;

a data request unit that, when said data acquisition request is a data relay request, requests data corresponding to a data name extracted by said request analysis unit from the data supply unit and receives data sent from the data supply unit in response to the request;

a history management unit that, when said data acquisition request is a data relay request, associatively stores data received by the data request unit, the name of the data, and time when data relay processing was performed, in the history memory as history information, and outputs the data received by the data request unit, while, when said data acquisition request is a history information acquisition request, using the data name and time extracted by said request analysis unit to search said history memory for appropriate history information by a search method extracted by said request analysis unit and outputting data contained in the detected history information; and an output unit that outputs the output data located by said history management unit to the data use unit from which said data acquisition request was output.

22. A computer-readable recording medium storing an information browsing program for relaying data to and from a server and accessing data on the server connected through a network via a data relay device, which associatively manages relayed data, a data name, and time as management information and sends back data contained in appropriate history information in response to a data acquisition request containing a data name, time, and a search method, a computer being instructed to execute the information browsing program comprising:

a request unit that outputs a data acquisition request specifying a data name to said data relay device when accessing the most recent data on the server, while outputting a data acquisition request specifying a data name, time, and a search method when accessing data of history information stored in said data relay device;

a data acceptance unit that receives data sent from said data relay device in response to said data acquisition request; and a display device that displays data received by said data acceptance unit on the screen of a display device.

* * * * *